(12) United States Patent
Lee et al.

(10) Patent No.: US 6,405,639 B1
(45) Date of Patent: Jun. 18, 2002

(54) MEAT ROASTER

(75) Inventors: Keun-Jin Lee, Seoul; Kwan-Cheol Park, Kyeonggi-Do, both of (KR)

(73) Assignee: Youhan Electronics Co., Ltd., Kyeonggi-Do (KR)

(*) Notice: Subject to any disclaimer, the term of this patent is extended or adjusted under 35 U.S.C. 154(b) by 0 days.

(21) Appl. No.: 09/656,528

(22) Filed: Sep. 7, 2000

Related U.S. Application Data

(63) Continuation of application No. PCT/KR99/00110, filed on Mar. 9, 1999.

(30) Foreign Application Priority Data

| Mar. 10, 1998 | (KR) | 98-3402 |
| Mar. 10, 1998 | (KR) | 98-3403 |
| Dec. 23, 1998 | (KR) | 98-26976 |
| Mar. 8, 1999 | (KR) | 99-3594 |
| Mar. 9, 1999 | (KR) | 99-7647 |
| Mar. 19, 1999 | (KR) | 99-3592 |
| Mar. 19, 1999 | (KR) | 99-3593 |

(51) Int. Cl.[7] .............................. A47J 37/06; A47J 37/07
(52) U.S. Cl. ............................. 99/331; 99/339; 99/422; 99/450; 126/25 R; 126/41 R
(58) Field of Search ...................... 99/422, 330, 339, 99/340, 448, 417, 450, 403; 165/104.19, 104.21, 104.26; 126/25 R, 41 R; 219/386, 524, 525

(56) References Cited

U.S. PATENT DOCUMENTS

| 1,775,790 | A | * | 9/1930 | Tawlks | 126/163 R X |
| 4,632,089 | A | * | 12/1986 | Wardell | 126/25 R |
| 4,798,132 | A | * | 1/1989 | Chan | 99/331 |
| 5,189,945 | A | * | 3/1993 | Hennick | 99/339 |
| 5,239,916 | A | * | 8/1993 | Hu | 99/422 |
| 6,062,129 | A | * | 5/2000 | Tippmann et al. | 99/330 |
| 6,158,426 | A | * | 12/2000 | Wardell | 126/25 R |

* cited by examiner

Primary Examiner—Reginald L. Alexander
(74) Attorney, Agent, or Firm—Hamilton, Brook, Smith & Reynolds, PC

(57) ABSTRACT

A meat roaster capable of preventing meat from burning and sticking to a grill is provided. The meat roaster includes a body having an accommodating portion for accommodating a heat source. A grill connected to the body includes a frame and a fluid circulating pipe. The pipe is mounted at one side of the frame in such manner that the pipe is repeatedly bent at regular intervals. The pipe has an inlet socket formed at one end of the pipe and an outlet socket at the other end of the pipe. A temperature controller controls a fluid circulating through the pipe of the grill at a predetermined temperature which prevents the grill from overheating.

16 Claims, 38 Drawing Sheets

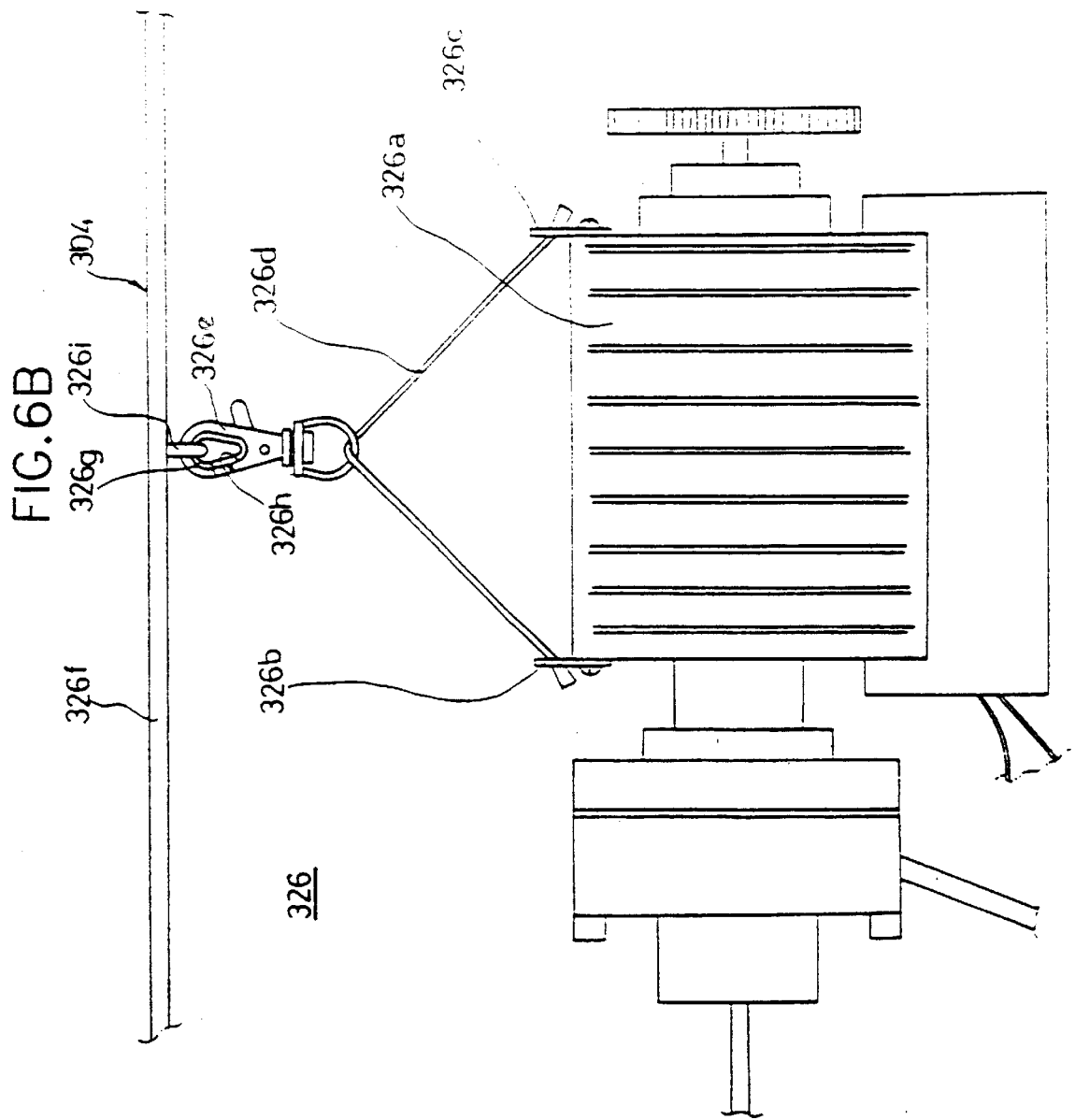

FIG.10B

| TIME (MIN.) | HEAT SOURCE (°C) | ENTERANCE (°C) | EXIT (°C) | DIFFERENCE (°C) |
|---|---|---|---|---|
| 0 | 33.7 | 11.2 | 11.3 | 0.1 |
| 6 | 385 | 32 | 59 | 27 |
| 9 | 430 | 52.5 | 78 | 25.5 |
| 11 | 400 | 59 | 84 | 25 |
| 12 | 370 | 56 | 81 | 25 |
| 15 | 355 | 50 | 76 | 26 |
| 16.5 | 340 | 48 | 73 | 25 |
| 18 | 340 | 46.5 | 73.5 | 27 |
| 21 | 325 | 45 | 71 | 26 |
| 22.5 | 360 | 44.5 | 70 | 25.5 |
| 24 | 370 | 50 | 74 | 24 |
| 26.25 | 370 | 60.5 | 84 | 23.5 |
| 27 | 370 | 58 | 82 | 24 |
| 30 | 370 | 50 | 75 | 25 |
| 33 | 355 | 46.5 | 71 | 24.5 |
| 34.25 | 340 | 45.5 | 69 | 23.5 |
| 36 | 325 | 52 | 75 | 23 |
| 38 | 355 | 62 | 84 | 22 |
| 42 | 355 | 51 | 74 | 23 |
| 45 | 340 | 46 | 68 | 22 |
| 48 | 295 | 59 | 80 | 21 |
| 49.5 | 305 | 63.5 | 83 | 19.5 |
| 51 | 305 | 58 | 77 | 19 |
| 54 | 295 | 49 | 69 | 20 |
| 55.5 | 287 | 47 | 67.5 | 20.5 |
| 57 | 275 | 53.5 | 73 | 19.5 |
| 60 | 275 | 64 | 82 | 18 |
| 65 | 274 | 50.5 | 69.1 | 18.6 |
| Min. | 274 | 44.5 | 67.5 | 18 |
| Max. | 430 | 64 | 84 | 27 |
| AVERAGE | 339.48 | 52.6 | 75.4 | 22.8 |
| STANDARD DEVIATION | 39.48 | 6.12 | 5.47 | 2.58 |
| RANGE | 156 | 19.5 | 16.5 | 9 |

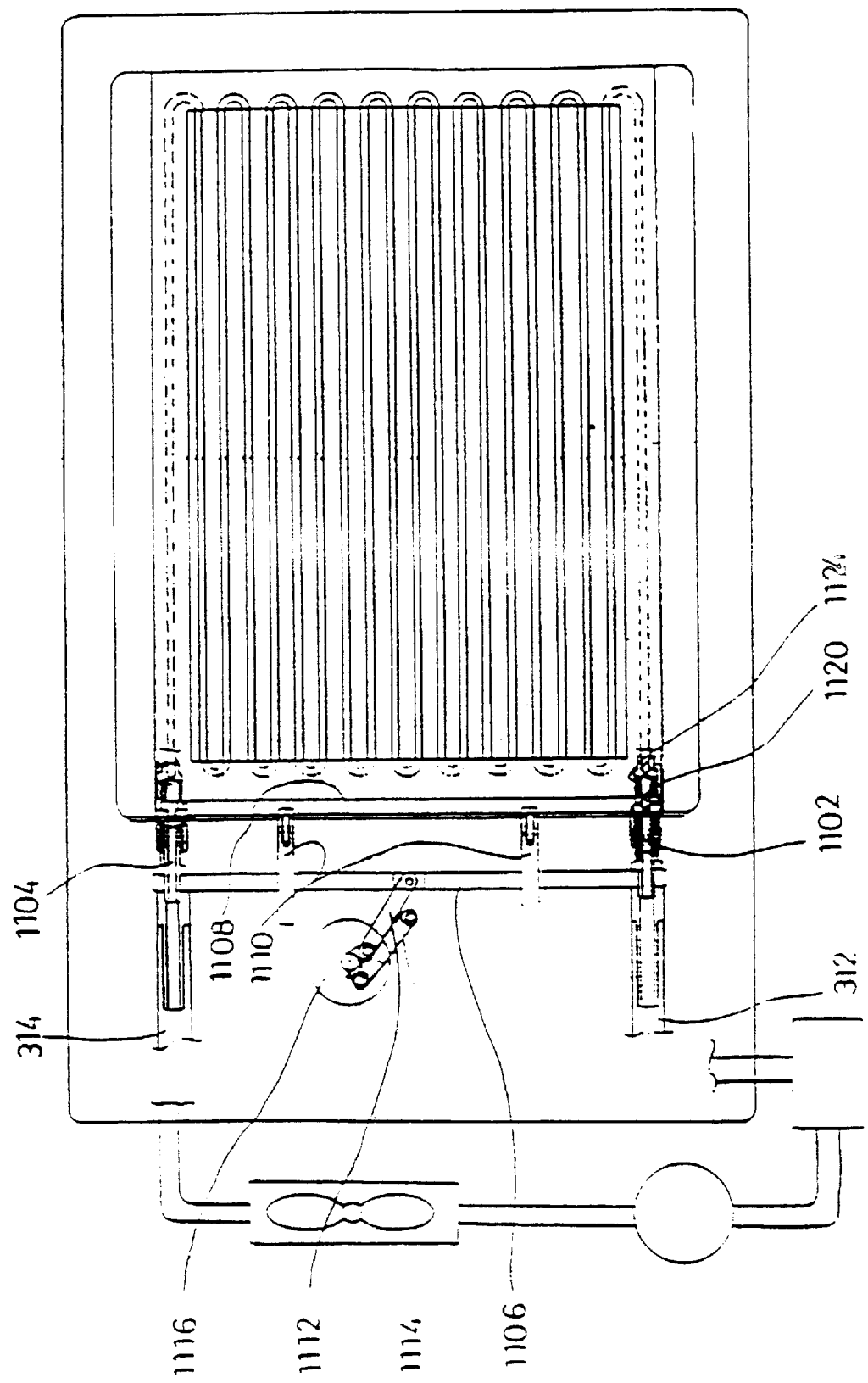

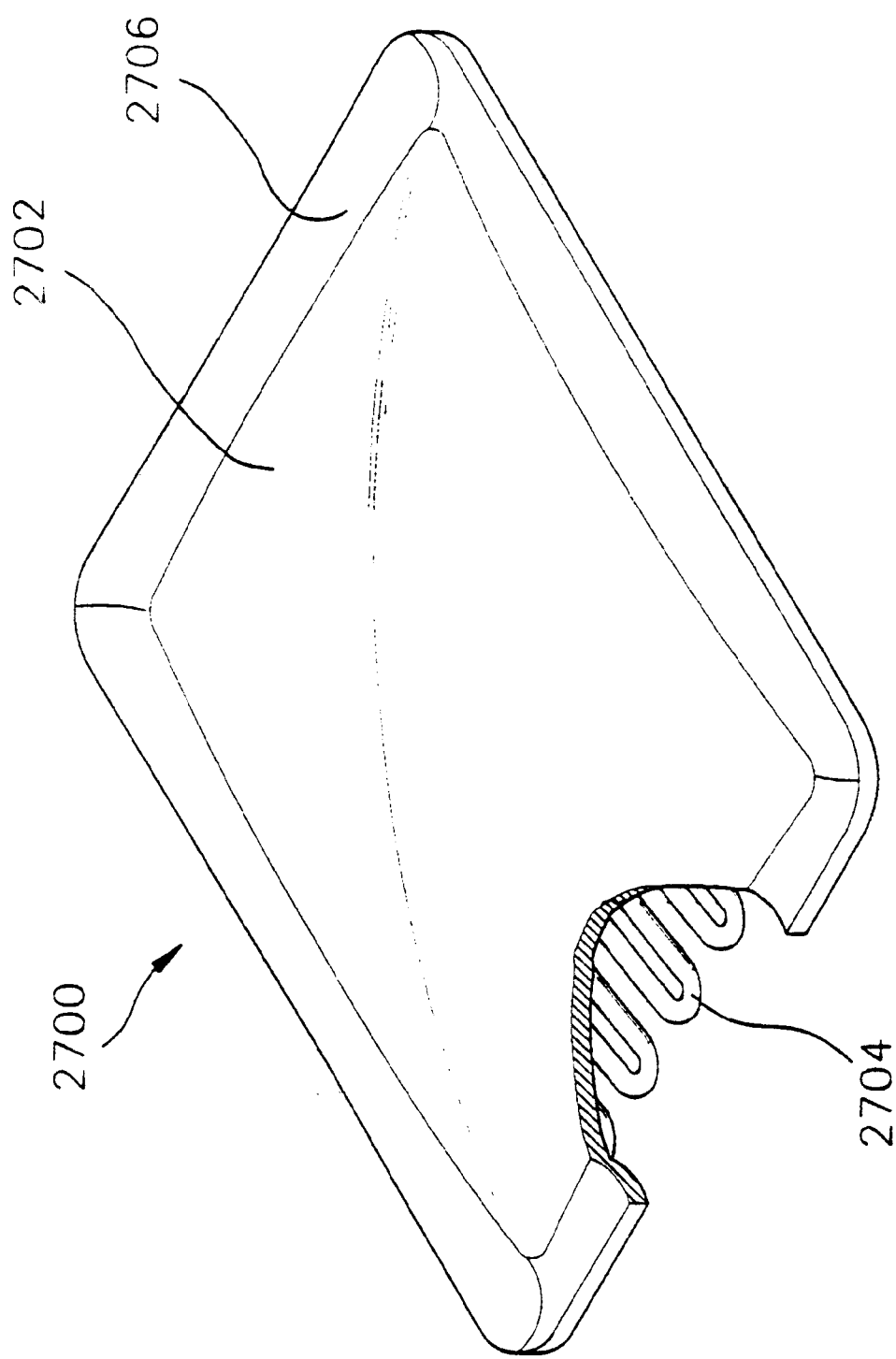

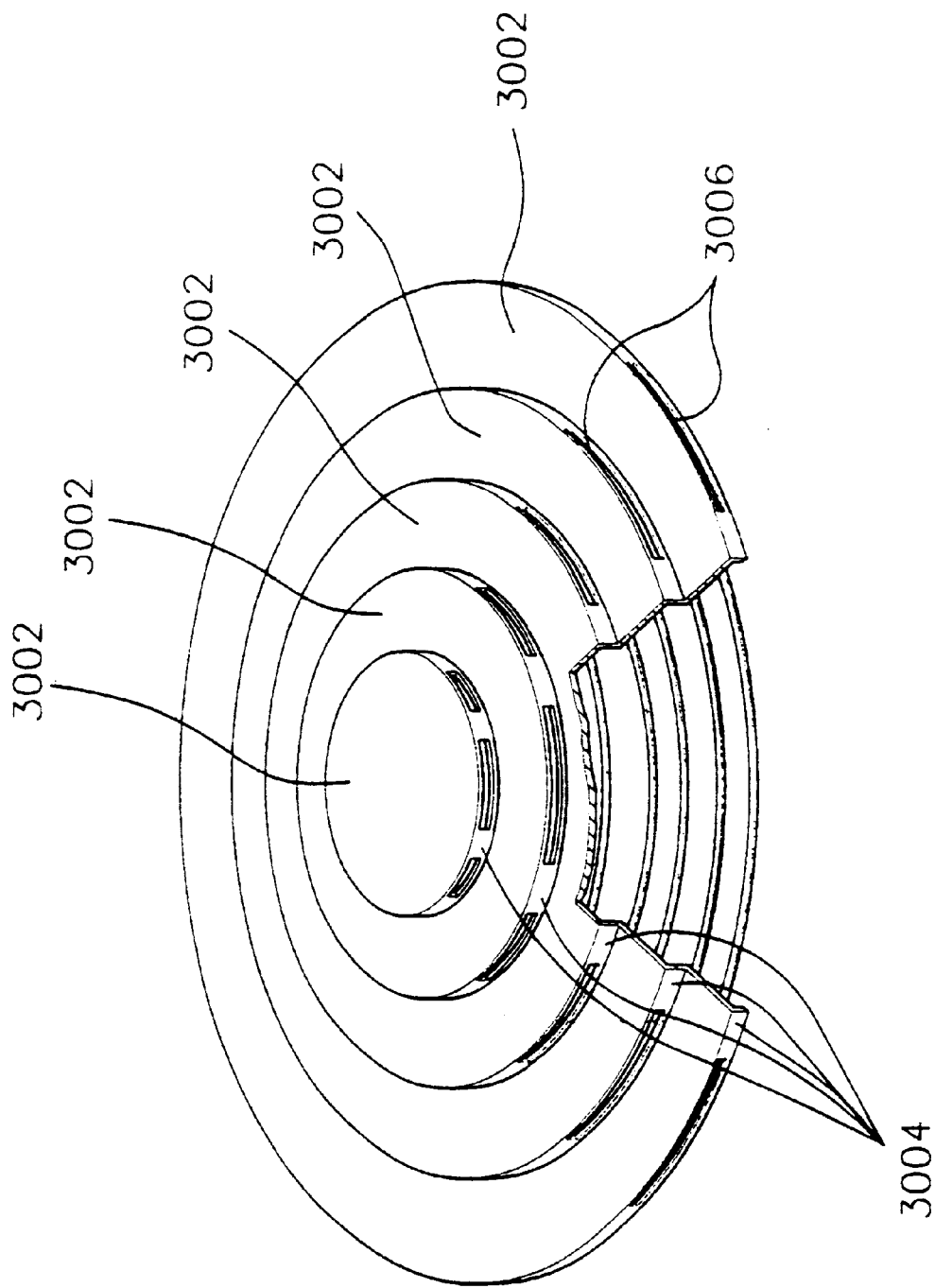

MEAT ROASTER

RELATED APPLICATIONS

This application is a continuation of PCT application No. PCT/KR99/00110, filed Mar. 9, 1999, which claims priority to Korean patent application No. 99-7647, filed Mar. 9, 1999 and Korean utility model application Nos. 98-3402, filed Mar. 10, 1998; 98-3403, filed Mar. 10, 1998; 98-26976, filed Dec. 23, 1998; 99-3592, filed Mar. 8, 1999; 99-3593, filed Mar. 8, 1999; and 99-3594, filed Mar. 8, 1999, the entire teaching of which are incorporated herein by reference.

TECHNICAL FIELD

The present invention relates to a meat roaster, more particularly, a meat roaster through a fluid circulating pipe of a grill.

BACKGROUND ART

Generally, food such as meat or fish is heated by means of a heat source such as a charcoal fire during cooking the food, a gas fire, or an electricity and removes lard included therein to thereby have a good flavor. When cooking the meat, a grill is mounted apart from a heat source at a predetermined distance needs and cooks the meat slowly.

U.S. Pat. No. 4,744,292 (issued to Toshio Nagata on Mar. 17, 1998) discloses a device for roasting meats on both surfaces of the meats while grasping with the meat two grill frames at the same time which is done while roasting of the meat in a casing.

FIG. 1 is a perspective view of a conventional meat roaster for showing a state that a charcoal briquet vessel and a grill from a body thereof. FIG. 2 is a sectional view for showing a connecting state of the conventional meat roaster shown in FIG. 1.

The conventional meat roaster includes a body 102, a charcoal briquet vessel 104, and a grill 106. The body 102 is connected to a lower middle of a dinning table 202. The body 102 accommodated the charcoal briquet vessel 104 therein. The charcoal briquet vessel 104 has charcoal briquets in it. The grill 106 supports meats to be baked and has latticed portion 108 which are arranged at regular interval. The grill 106 is made from brass by means of a casting process. Meats are baked by heating power of the charcoal briquet in a state that a grill 106 is installed on an upper portion of the charcoal briquet vessel 104. While baking the meats, the grill 106 is overheated by a heating power of the charcoal briquet. Accordingly, regardless of a state of a baking process, the meats sticks to a surface of latticed portions 108 of the grill 106. When the inside of the meats does not get cooked, parts of the meat which contacts with the latticed portions 108 of the grill 106 are burned. Sequentially, while baking the meat, a burned grill should be replaced by a new one. Also, when being replaced by the new grill, it is rapidly heated. Thus, since the above process is repeated, a grill should be replaced with a new one several times.

DISCLOSURE OF THE INVENTION

Therefore, it is an object of the present invention, for the purpose of solving the above mentioned problems, to provide a meat roaster capable of preventing a meat from burning and preventing the meat from sticking to a grill.

In order to attain the object, according to the present invention, there is provided a meat roaster, said roaster comprising:

a body including an accommodating portion for accommodating a heat source;

a grill connected to the body including a frame and a fluid circulating pipe, the pipe being mounted at one side of the frame in such a manner that the pipe is repeatedly bent at regular intervals and having an inlet socket formed at one end of the pipe and an outlet socket at the other end of the pipe; and a temperature controller for controlling a fluid circulating through the pipe of the grill at a predetermined temperature.

There is also provided a meat roaster, said roaster comprising:

a grill including a frame having a plurality of guiding members formed at lower corners thereof and a fluid circulating pipe mounted at one side of a frame in such a manner that the pipe is repeatedly bent at regular intervals, the pipe having an inlet socket formed at one end of the pipe and an outlet socket at the other end of the pipe;

a body including an accommodating portion for accommodating the grill and a heat source and a plurality of guide rods vertically fixed on each corner of the accommodating portion;

first and second connecting members connected to one ends of first and second hoses for connecting the grill to the body, respectively; and a temperature controller for controlling the fluid circulating through the pipe of the grill at a predetermined temperature.

There is also provided a meat roaster, said roaster comprising:

a grill including at least one heat plate disposed apart from a heat source at a predetermined distance and a fluid circulating pipe mounted on at least one surface of the at least one heat plate in such a manner that the pipe is repeatedly bent at regular intervals, the pipe having an inlet socket formed at one end of the pipe into the pipe and an outlet socket at the other end of the pipe;

a body including an accommodating portion for accommodating the grill and heat source, the accommodating portion is stepped;

an attaching member connected to one end of first and second hoses for attaching or detaching the grill to and from the body; and a temperature controller for controlling the fluid circulating through the pipe of the grill at a predetermined temperature.

In accordance with the present invention, the meal roaster according to the present invention circulates a cooling fluid through a fluid circulating pipe of a grill while cooking a meat to thereby prevent the grill from overhearing. Thus, during cooking the meat, the meat which contacts with the grill is prevented From burning and from sticking to a grill.

Other objects and further features of the present invention will become apparent from the detailed description when read in conjunction with the attached drawings.

BRIEF DESCRIPTION OF THE DRAWINGS

Other features and advantages of the present invention will become more apparent from the following description taken in connection with the accompanying drawings, wherein:

FIG. 6B is a sectional side view for showing a state that the pump is installed in FIG. 3;

FIGS. 10A and 10B are a graph and a table for showing temperatures of the heat source, a grill entrance, and a grill exit according to an embodiment of the present invention, respectively.

FIG. 11A is a plan view showing another attaching member of a meat roaster according to an embodiment of the present invention;

BEST MODE FOR CARRYING OUT THE INVENTION

The preferred embodiment of the present invention will hereinafter be described in detail with reference to the accompanying drawings.

EMBODIMENT 1

Figure 1:
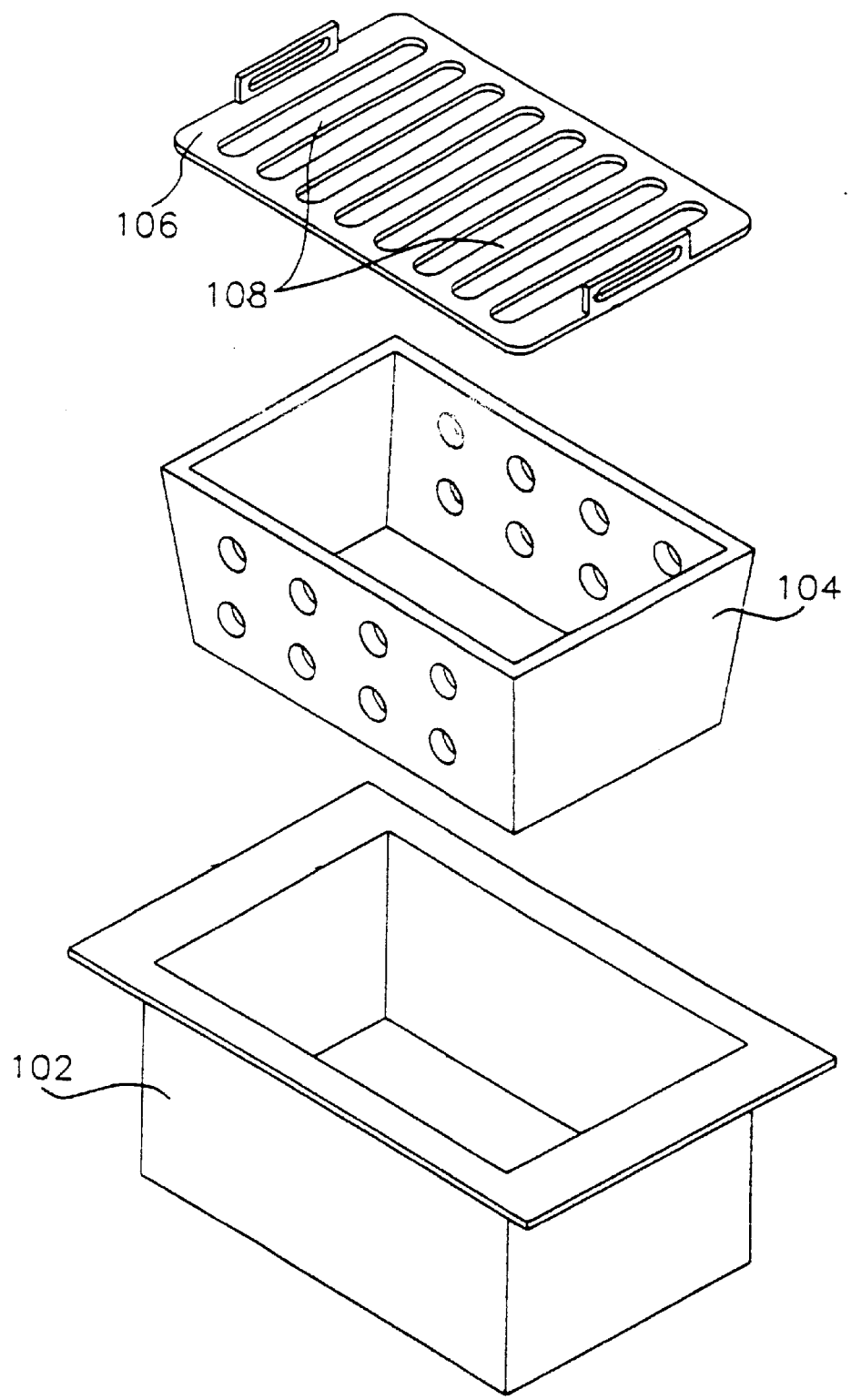
FIG. 1 is a perspective view of a conventional meat roaster for showing a charcoal briquet vessel and a grill from a body thereof.
Figure 2:
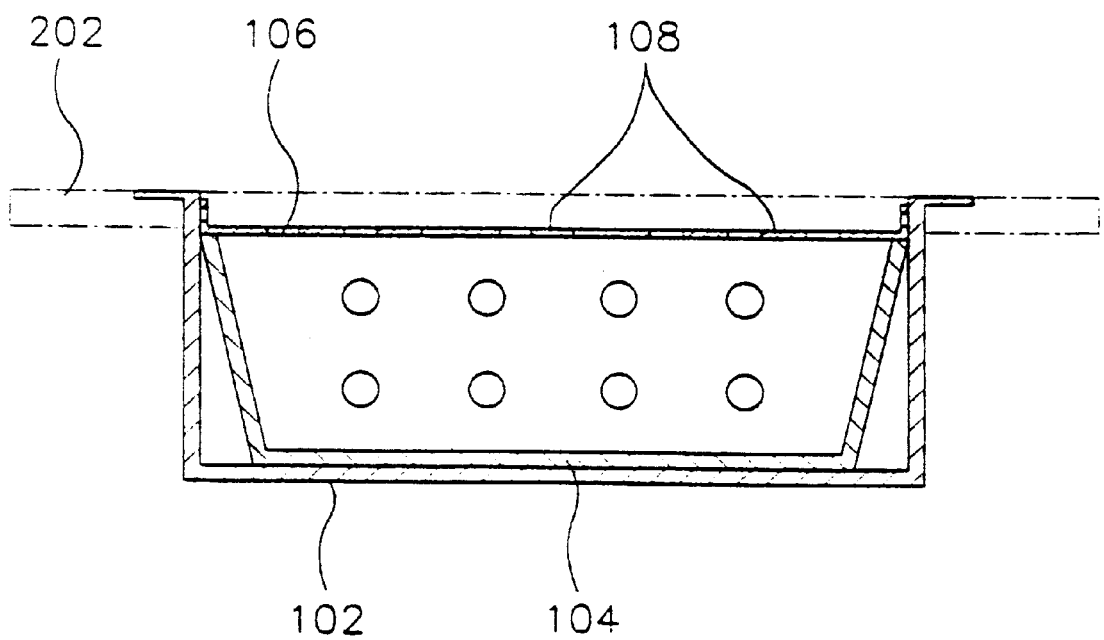
FIG 2 is a sectional view for showing a connecting state of the conventional meat roaster shown in FIG. 1.
Figure 3:
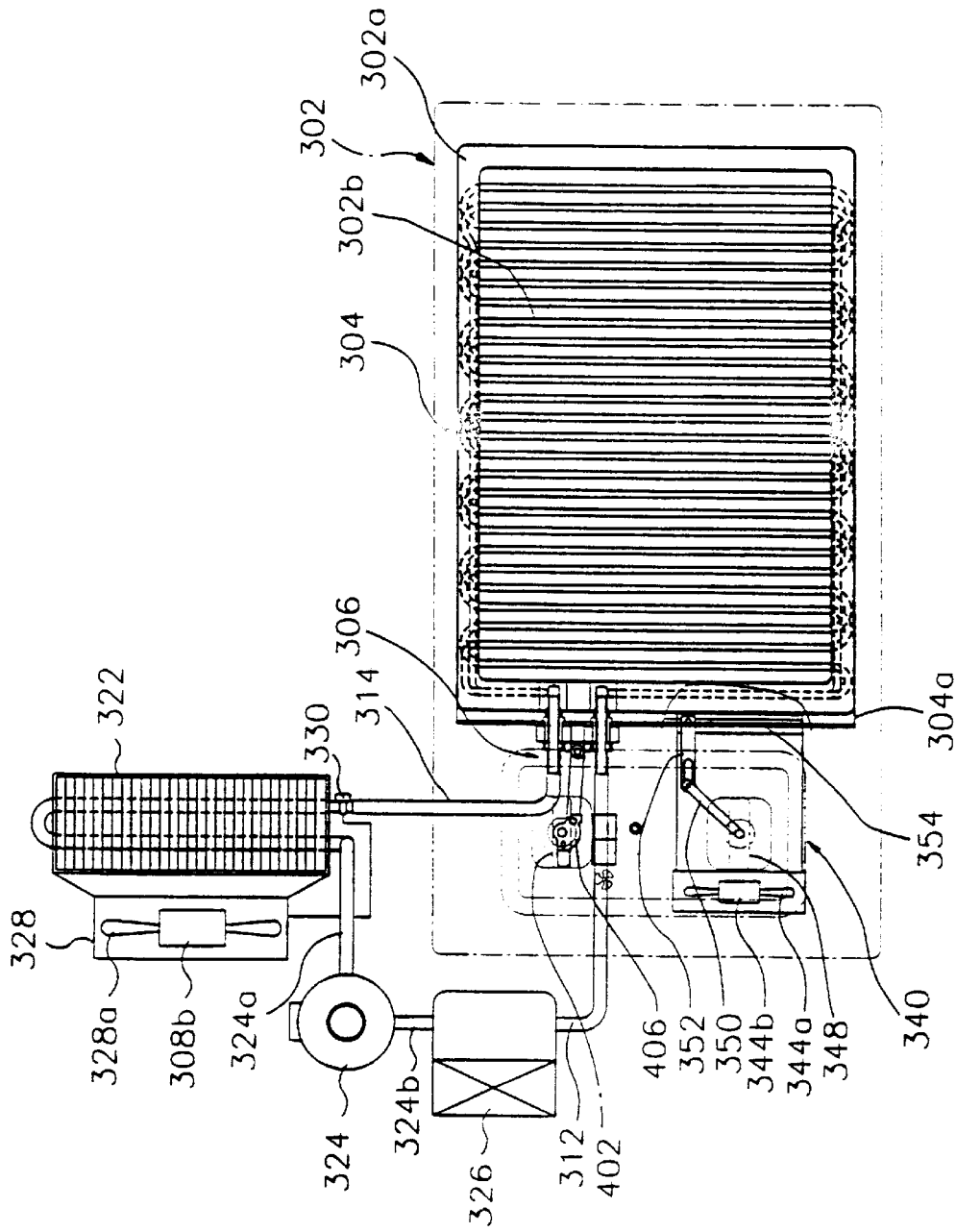
FIG. 3 is a plan view schematically showing a meat roaster according to a first embodiment of the present invention.

FIG. 3 is a plan view of schematically showing a meat roaster 30 according to an embodiment of the present invention.

The meat roaster 30 includes a grill 302, a body 304, an attaching member 306, and a temperature controller 308. The grill 302 includes a frame 302a and a fluid circulating pipe 302b. The fluid circulating pipe 302b is mounted at one side of the frames 302a such in a manner that the pipe is repeatedly bent at regular intervals. The fluid circulating pipe 302b has an inlet socket 302c and an outlet socket 302d formed at one end and another end of the fluid circulating pipe 302b, respectively. The body includes an accommodating portion 304a for accommodating the grill 302 and a heat source 430.

The attaching member 306 is connected to one end of first hose 312 and one end of a second hose 312 and attaches or detaches the grill 302 to and from the body 304.

Figure 4:
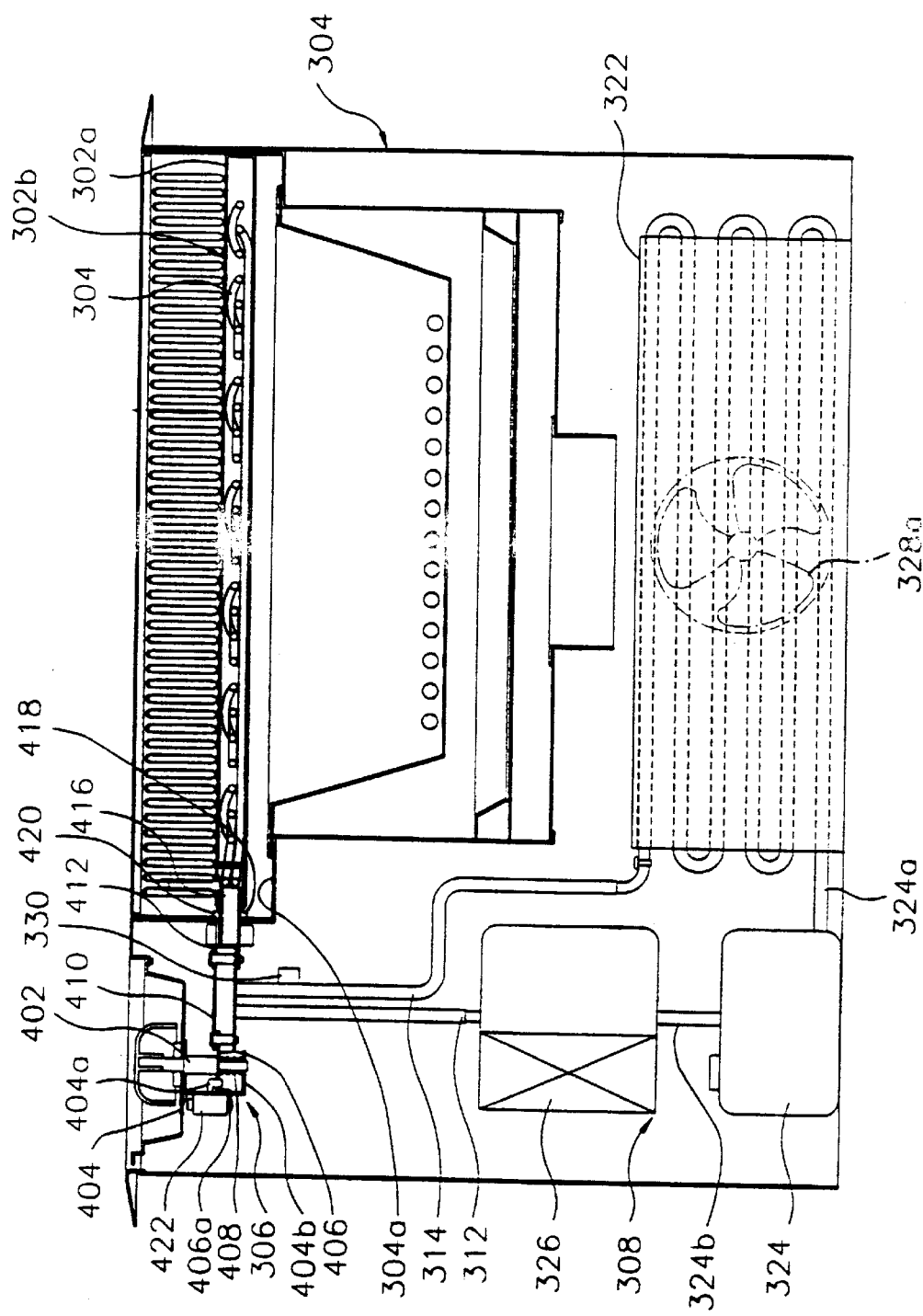
FIG. 4 is a sectional side view of the meat roaster shown in FIG. 3.
Figure 5:
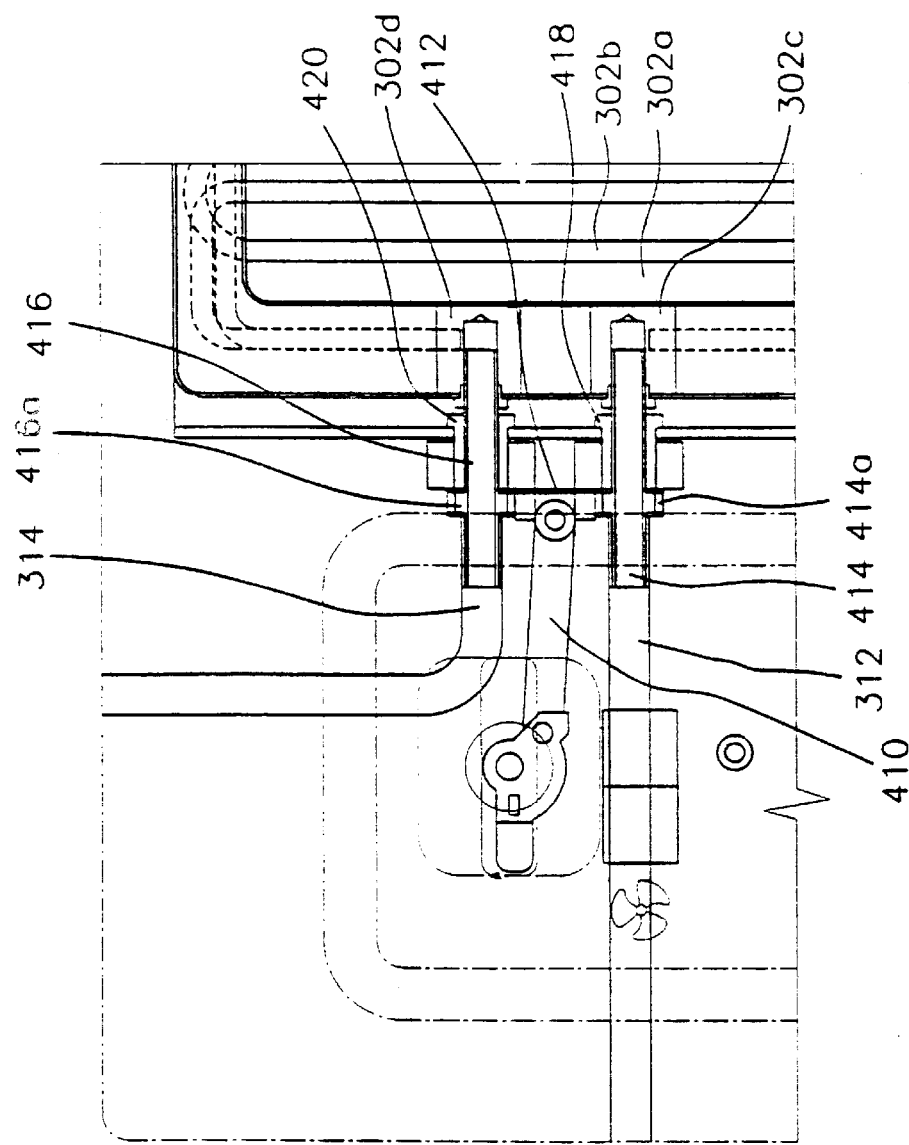
FIG. 5 is a sectional view of details of the attaching member taken from FIG. 4.

FIG. 4 is a sectional side view of the meat roaster shown in FIG. 3. FIG. 5 is a sectional view of details of the attaching member 30 taken from FIG. 4.

The attaching member 306 includes a first knob 402, a bracket 404, a rotating plate 406, a spring 408, a double link 410, a connector 412, first and second moving tubes 414 and 416, first and second bushes 418 and 420, and a switch 422.

The knob 402 is mounted on an upper surface of the body 304. The first knob 402 has a hook 402a at a lower end portion which is stepped. The bracket 404 has a guide 404a protruded downward at an inner middle side thereof. The bracket 404 also has a fixed portion 40b having an opening 404c formed at a lower end thereof so that a lower portion of the knob 402 passes through the opening 404c of the bracket 404. An upper end of the bracket 404 is fixed to a lower surface of the body 304. The rotating plate 406 has a rotating member 406a which is stepped. The rotating plate 406 has an opening 406c formed at one side of the operating member 406a.

The spring 408 elastically pushes the rotating plate 406 and knob 402. The double link 410 is hingedly connected to the rotating plate 406. The connector 412 is hingedly connected to the double link 410.

The first and second moving tubes 414 and 416 are attached or detached to and from the inlet and outlet sockets by an operation of the knob 402. The first and second moving tubes 414 and 416 have first and second projections 414a and 416a formed on outer surfaces thereof, respectively, so that both ends of the connector 412 are connected to the first and second projections 414a and 416a. Respective one ends of the first and second moving tubes 414 and 416 are connected to the first and second hoses 312 and 314.

The first and second bushes 418 and 420 are slidably inserted into the first and second moving tubes 414 and 416 at one side of the accommodating portion 304a of the body 304, respectively. The switch 422 is mounted at an outer side of the bracket 404. A lower terminal of the switch 422 is fixed to the operating member 406a of the rotating plate 406. The switch 422 turns on or turns off the temperature controller 310 by motion of the operating member 406a of the rotating plate 406.

The temperature controller 308 controls a fluid circulating thorough the fluid circulating pipe 302b at a predetermined temperature. Preferably, in an embodiment of the present invention, the fluid circulating through the fluid circulating pipe 302b is maintained at 70° C. through 80° C.

The temperature controller 308 includes a heat exchanger 322, a tank 324, a pump 326, a cooling blower 328, temperature sensor 330, and a lamp 332. The heat exchanger 322 has a plurality of fins arranged in parallel at predetermined intervals on an outer surface of an outlet hose 314. The tank 324 is connected to the heat exchanger 322 through a connecting hose 324a. The tank 324 stores a fluid to be circulated.

Figure 6A:
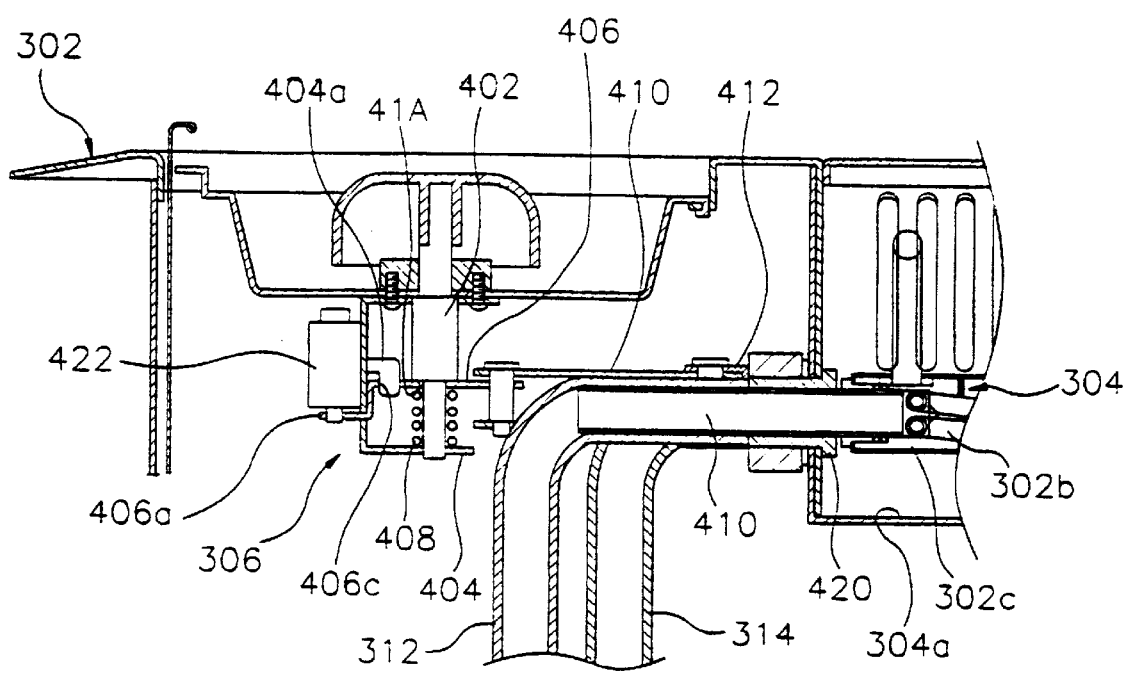
FIG. 6A is a view for showing a state that a grill is attached to a body by the attaching member shown in FIGS. 3 through 5.

FIG. 6B is a sectional side view for showing a state that the pump is installed in FIG. 3. The pump 326 pumps the fluid from the tank 324 to the fluid circulating pipe 302a through a connecting hose 32b. The pump 326 includes a driving motor 326a, first and second installed portions 326b and 326c, a wire 326d, a suspension portion 326e, a bracket 326f, and a packing 326g. The first and second installed portions 326b and 326c are fixed to both sides of the driving motor 326a. Both ends of the wire 326d are fixed to the first and second installed portions 326b and 326c. One end of suspension portion 326e is inserted into the wire 326d and the other end thereof has a hole 326h. The bracket 326f includes a projection 326i on a lower surface thereof so that the projection 326i is suspended by the hole 326h of the suspension portion 326e. One end of the bracket 326f is fixed to one side of the body 304. The packing 326g is mounted to a connecting point of the hole 326e and projection 326i.

The cooling blower 328 blows cool air to the heat exchanger 322. The cooling blower 328 includes a cooling fan 328a and a fan motor 328b. The cooling fan 328a blows the cool air. The fan motor 328b is connected to the cooling fan 328a and drives the cooling fan 328a. The temperature sensor 330 senses a temperature of a fluid discharged from the fluid circulating pipe 302a and controls an operation of the blower 328 according to a sensing result. The lamp 332 is turned on or off according to an operation of the pump 326.

The meat roaster 30 further includes a heating power controller 340 connected to one side of the accommodating portion 302a. The heating power controller 30 supplies external air to the heat source in order to control heat generated by the heat source 403.

Figure 8:
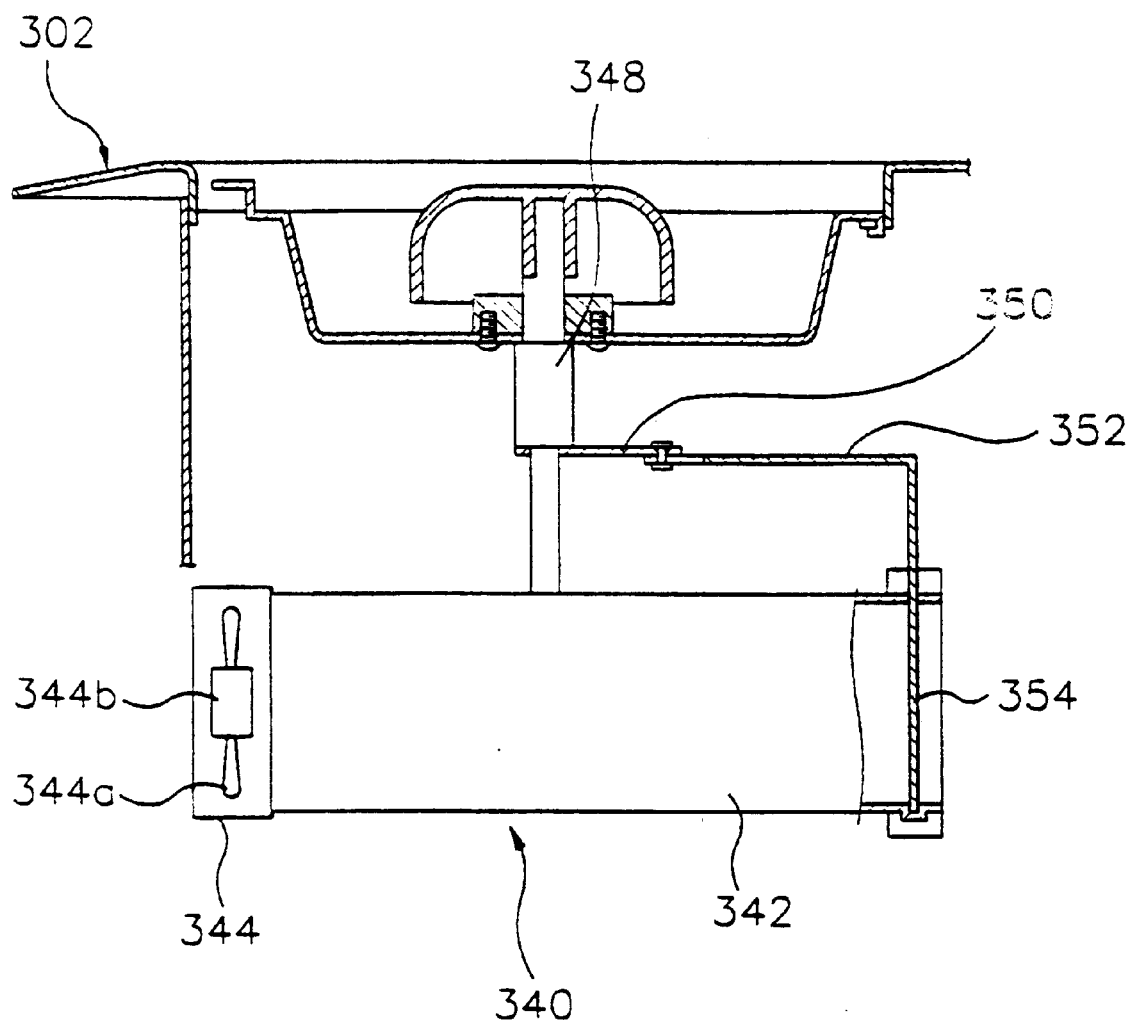
FIG. 8 is an expanded sectional view for showing an operation of the heating power controller shown in FIGS. 3 and 7.

FIG. 8 is an expanded plan view for showing an installed state of the heating power controller shown in FIG. 3. The heating power controller 340 includes at blowing tube 342, a blower 344, a switch 346, a knob 348, a first link 350, a second link 352, and an opening/closing portion 354.

The blowing tube 342 is mounted at one side of the accommodating portion 304a of the body 304 and communicates with the outside. The blower 344 is mounted at an entrance side of the blowing tube 342 and blows external air to the heat source through the blowing tube 342. The blower 344 includes a fan 344a and a motor 344b. The fan 344a blows external air. The motor 344b is connected to the fan 344a and drives the fan 344a. The switch 346 is installed on an upper surface of the body 304 and controls an operation of the blower 344. The knob 348 is rotatably mounted on an upper surface of the body 304.

The first link 350 is fixed to a lower end of the knob 348 and rotates by a rotation of the knob 348. The second link 352 is hingedly connected to the first link 350. The opening/closing portion 354 is hingedly connected to the second link 352 and controls the amount of external air from the blower 344.

Figure 7:
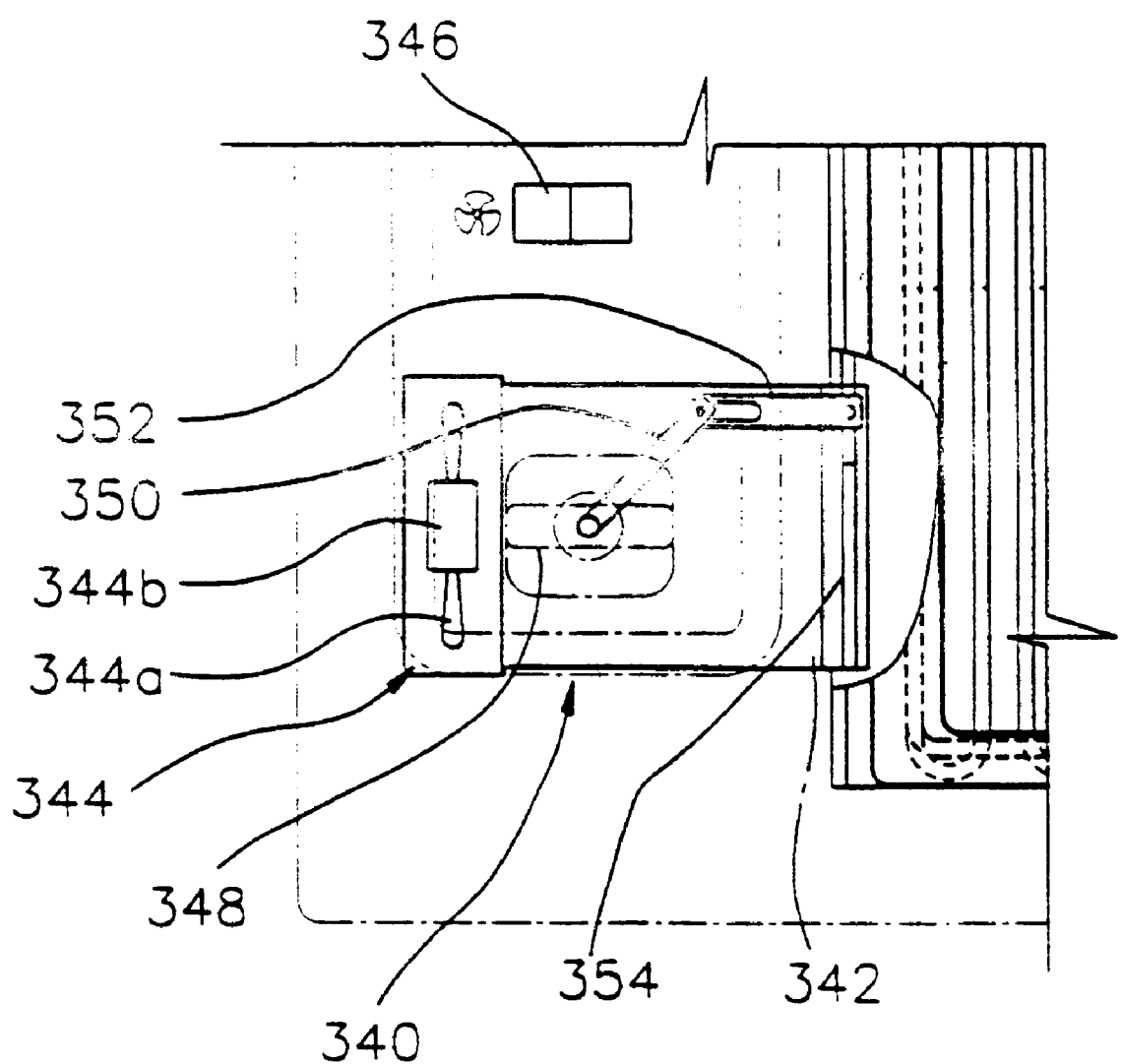
FIG. 7 is an expanded plan view for showing an installed state of the heating power controller shown in FIG. 3.

Hereinafter, an operation of the power heating controller 340 will be explained referring to FIGS. 7 and 8.

When a user rotates the knob 348 to one direction, a switch 346 is turned on to thereby drive the motor 344b of the blower 344. In the state, when the user rotates the knob 348 in one direction, the first link 352 rotates the second link 354 to one direction and pulls the second link 354. When the second link 354 is pulled, the second link 354 rotates a moving rod of the opening/closing portion 354 to one direction so that each rotating member opens an exit of the blowing pipe 342.

At this time, when the user continuously rotates the knob 348 in one direction, an opening stale of the opening/closing portion 354 becomes wider. Accordingly, external air from a fan 344a of the blower 344 is supplied to a lower portion of the accommodating portion 304a through the opening/closing portion 354. As a result, the heating power of the heat source can be increased. When the user rotates the knob 348 in a direction opposite to the direction as mentioned above, the opening/closing portion 354 closes an exit of the blowing pipe 342 by means of linkage of the first and second links 350 and 352. And the switch is turned off to thereby stop the motor 344b.

Figure 9A:
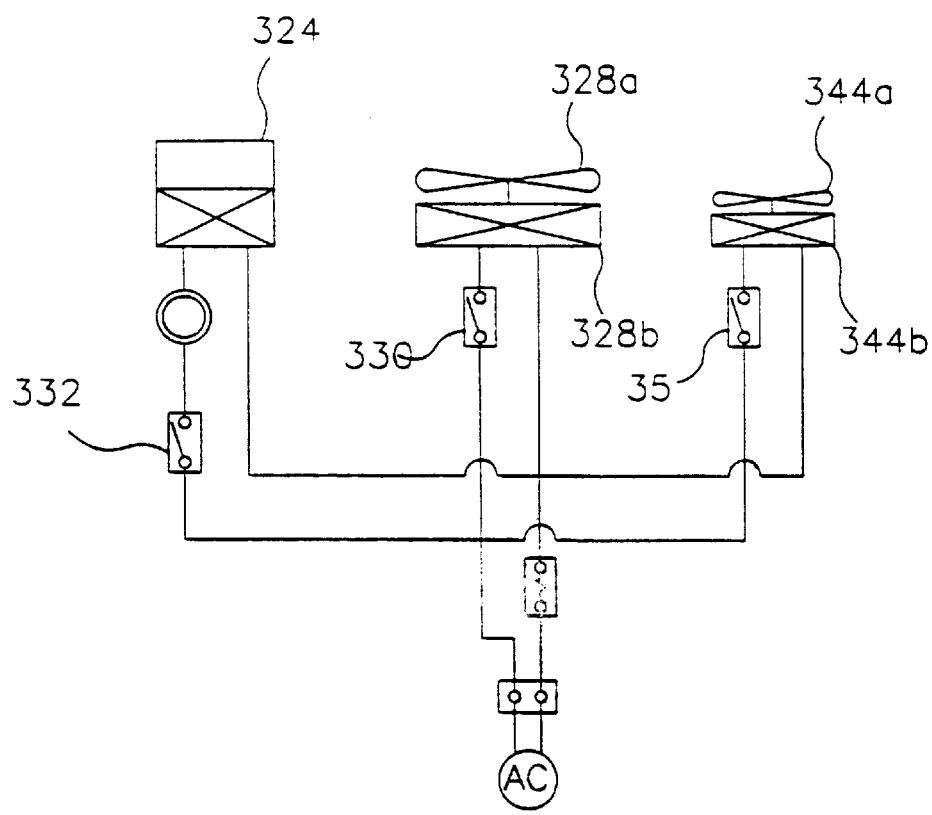
FIGS. 9A and 9B are circuitry diagrams for showing states of AC and DC power supplies which are amplied to a pump, a cooling blower, a temperature sensor, a heating power controller, and a lamp shown In FIG. 3, respectively.
Figure 9B:
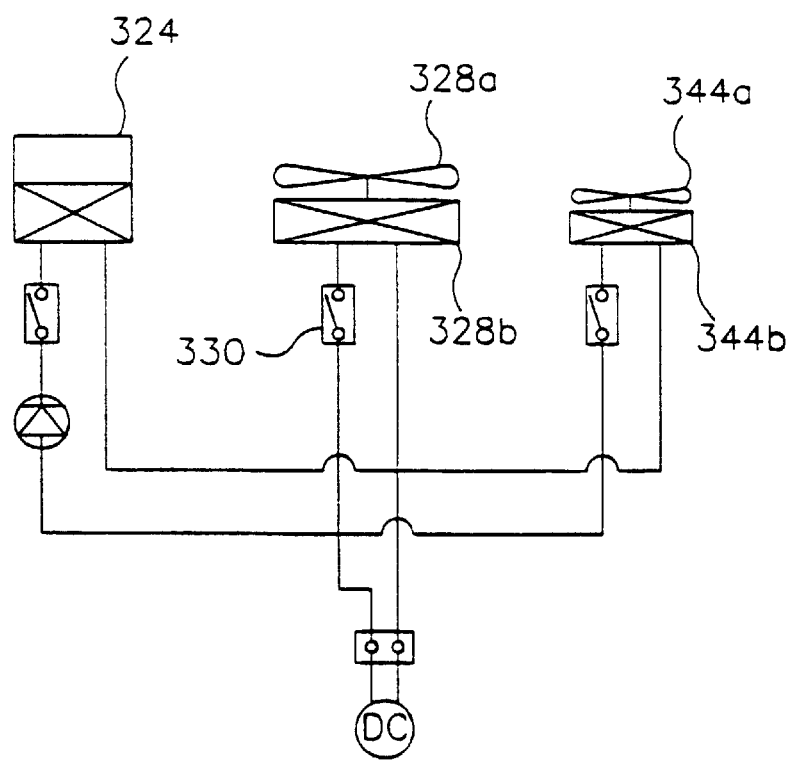

FIGS. 9A and 9B are circuitry diagrams for showing states of alternative current (AC) and direct current (DC) power supplies which are applied to a pump 324, a motor 328b of a cooling blower 328, a temperature sensor 330, a motor 344b of blower 344 of a heating power controller 340, and a lamp 332 shown in FIG. 3, respectively. Both AC and DC power supplies can be used for a power supply according to the meat roaster 30. Therefore, the AC and DC power supplies are power supplied that the meat roaster 30 is used in the room and for a field.

Hereinafter, an operation of the meat roaster 30 according to the first embodiment of the present invention will be described.

In order to use the meat roaster 30, a user disposes the heat source 430 at a lower portion of the accommodating portion 304a. And the user disposes the grill 302 on an upper side of the accommodating portion 304a. Then the user operates the knob 402 of the attaching member 306 to thereby drive the pump 326 of the temperature controller 310. As this time the user connects the first and second moving pipes 414 and 416 to the inlet and outlet sockets 302c and 302d. Accordingly, a fluid which is stored in tank 324 is moved to the fluid circulating pipe 320b and circulates through the fluid circulating pipe 320b.

An operation of the attaching member 306 will be described referring to FIG. 3 through FIG. 6.

When the user presses the knob 402, a lower end of the knob 402 is moved downwards to thereby move the rotating plate 406 downwards. Accordingly, the spring is compressed and the guide 404a breaks away from the opening 406c. And the operating member 406a moves a terminal of the switch 422 downwards so that the switch 422 operates. At this time, the rotating plate 406 moves at an interval between links of the double link 410 downwards and does not affect the double link 410.

As described previously, the pump 326 of the temperature controller 308 operates and starts to pump the fluid which is stored in the tank 324. Simultaneously, when the user rotates the knob 402 to one direction, the rotating plate 406 rotates to one direction. Accordingly, the double link 410 moves to a direction of the grill 302 and the connector 412 is linked with the double link 410 and moves to a direction of the grill 302. When the connector 412 moves to one direction, first and second moving pipes 414 and 416 move to a direction of the grill 302 and the other end of the connector 412 is connected to the inlet and outlet sockets 302c and 302d of the grill 302.

By means of the above process, when the fluid stored in the tank 324 is supplied into the fluid circulating pope 302b and circulates therethrough, a fluid of low temperature circulates through the fluid circulating pipe 302b and is increased by means of the heat of the heat source 430. At this time, the temperature sensor 330 of the temperature controller 310 senses a temperature of the fluid discharged to the outlet hose 314 through the fluid circulating pipe 302b.

When the temperature of the discharged fluid is equal to or higher than 80° C., the temperature sensor 310 turns on the fan motor 328b of the cooling blower 328 to thereby drive the cooling fan 328a. By the driving of the cooling fan 325a, a temperature of the fluid flowing through the heat exchanger 322 is reduced so that a fluid of lower temperature is fed into the inlet hose 312.

On the other hand, when a temperature of the fluid discharged into the outlet hose 314 from the fluid circulating pipe 302b is lower than 70° C., the temperature sensor 310 turns off the fan motor 328b. By repeating such a operation, the flowing fluid is maintained at a constant temperature of 70° C. through 80° C. to thereby prevent boiling of the fluid due to an increase of a temperature of the fluid. Accordingly, while the fluid circulates, the fluid supplied into the fluid circulating pipe 302b through the inlet socket 302c can be maintained at a constant temperature of about 70° C. And the fluid which circulates through the fluid circulating pipe 302b is increased by means of the heat source 430 and is maintained at about 80° C.

Figure 10A:
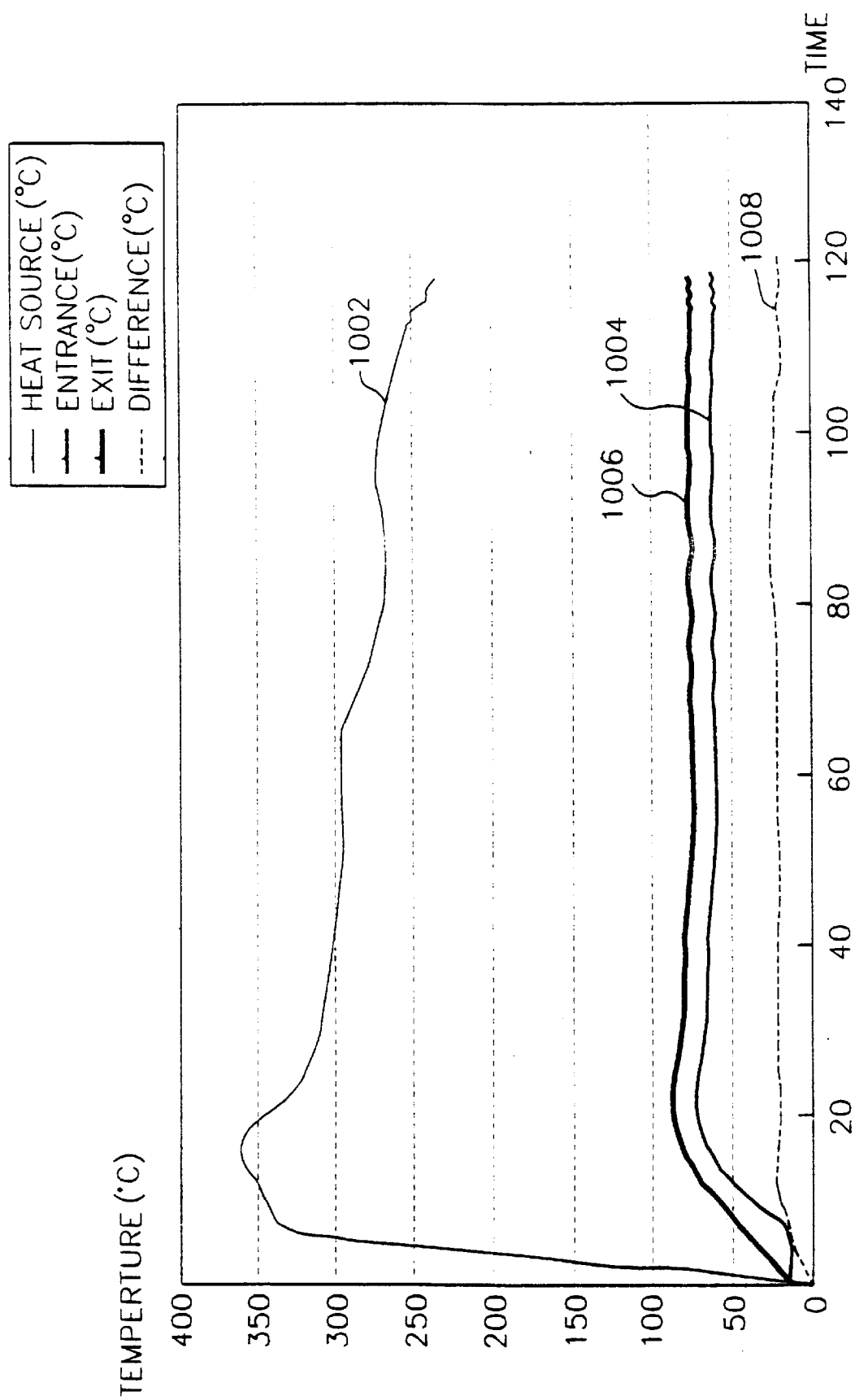

FIGS. 10A and 10B are a graph and a table for showing temperatures of the heat source, a grill entrance, and a, grill exit as a result of the Applicant's experimentation according to an embodiment of the present invention, respectively. Reference numerals 1002 and 1004 represent temperatures of grill entrance and exit. Reference numeral 1006 represents a difference of temperatures of grill entrance and exit.

With reference to FIGS. 10A and 10B, a temperature of the fluid passing through the inlet and outlet sockets 302c and 302d repeats a rise and fall at a range from 70° C. to 80° C. However, as the time passes, the temperature of the fluid ranges between 70° C. and 80° C. That is, the temperature of the fluid circulated through the fluid circulating pipe 302b is maintained within the constant range. Accordingly, meat supported on the grill 302 is not burned and can be cooked at a suitable temperature.

On the other hand, after the meat is cooked, in order to separate the grill 302 from the body 304, the user rotates the knob 402 in a direction opposite to the direction as described previously. Accordingly, a lower end of the knob 402 rotates in a direction opposite to the direction as described previously. And the other end of the rotating plate 406 moves the double link 410 to a direction of the bracket 404.

As the double link 410 moves to a direction of the bracket 404, the connector 412 moves. Accordingly, one respective end of the first and second moving pipes 414 and 416 are separated from the inlet and outlet sockets 302c and 302d. Simultaneously, as the rotating plate 406 moves by elasticity to the spring 408 upwards, a terminal of the limit switch 422 moves upwardly to thereby turn off the pump 326 of the temperature controller 310.

When the rotating plate 406 ascends, the guide 404a is inserted into the opening 406c. Accordingly, the ascending the rotating plate 406 is guided so that the rotating plate 406 returns to an original position. By operating the knob 402, the first and second moving pipes 414 and 416 are separated from the inlet and outlet sockets 302c and 302d. Accordingly, the grill 302 breaks away the accommodating portion 304a of the body 304.

Figure 11B:
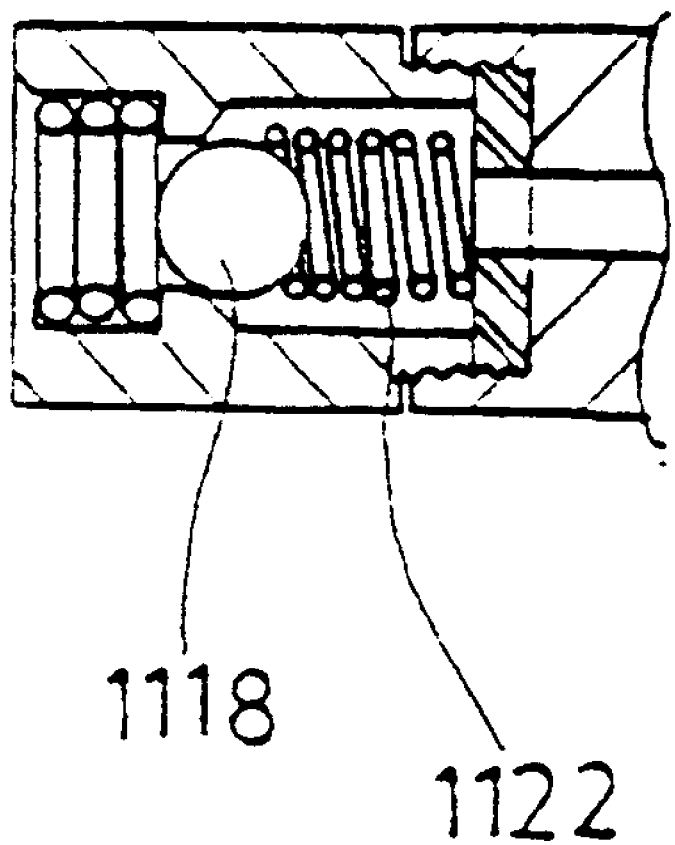
FIG. 11B is an enlarged detail of the first ball and first spring shown in FIG. 11A.

FIG. 11A is a plan view showing another attaching member 110 of a meat roaster according to an embodiment of the present invention. FIG. 11B is an enlarged detail of the first ball and first spring shown in FIG. 11A.

The attaching member 110 includes first and second connectors 1102 and 1104, a moving bar 1106, a first fixed bar 1108, a plurality of second fixed bars 1110, a link 1112, an arm 1114, a knob 1116, first and second balls 1118 and 1120, and first and second springs 1122 and 1124.

The first and second connectors 1102 and 1104 are mounted at one respective end of the inlet and outlet. hoses 312 and 315, respectively. The first and second connectors 1102 and 1104 are attached or detached to and from the fluid circulating pipe 302a. The moving bar 1106 vertically connects one end sides of the connectors 1102 is and 1104 to each other. The first fixed bar 1108 is arranged parallel to the moving bar 1106 and vertically connects the other end sides of the connectors 1102 and 1104. The plurality of second fixed bars 1110 vertically connects the moving bar 1106 and first fixed bar 1108. The link 1112 is pivotally connected to a middle portion of the moving bar 1106. The arm 1114 is hinged to one end of the link 1112. The knob 1116 is rotatably mounted at the body 304. A center of the knob 1116 is fixed to the arm 1114. The first and second balls 1116 and 1118 are disposed inside the fluid circulating pipe 304 and open or close the fluid circulating pipe 304. The first and second springs 1122 and 1124 elastically pushes the first and second balls 1116 and 1118 to directions of the inlet and outlet hoses 312 and 314, respectively.

EMBODIMENT 2

Figure 12A:
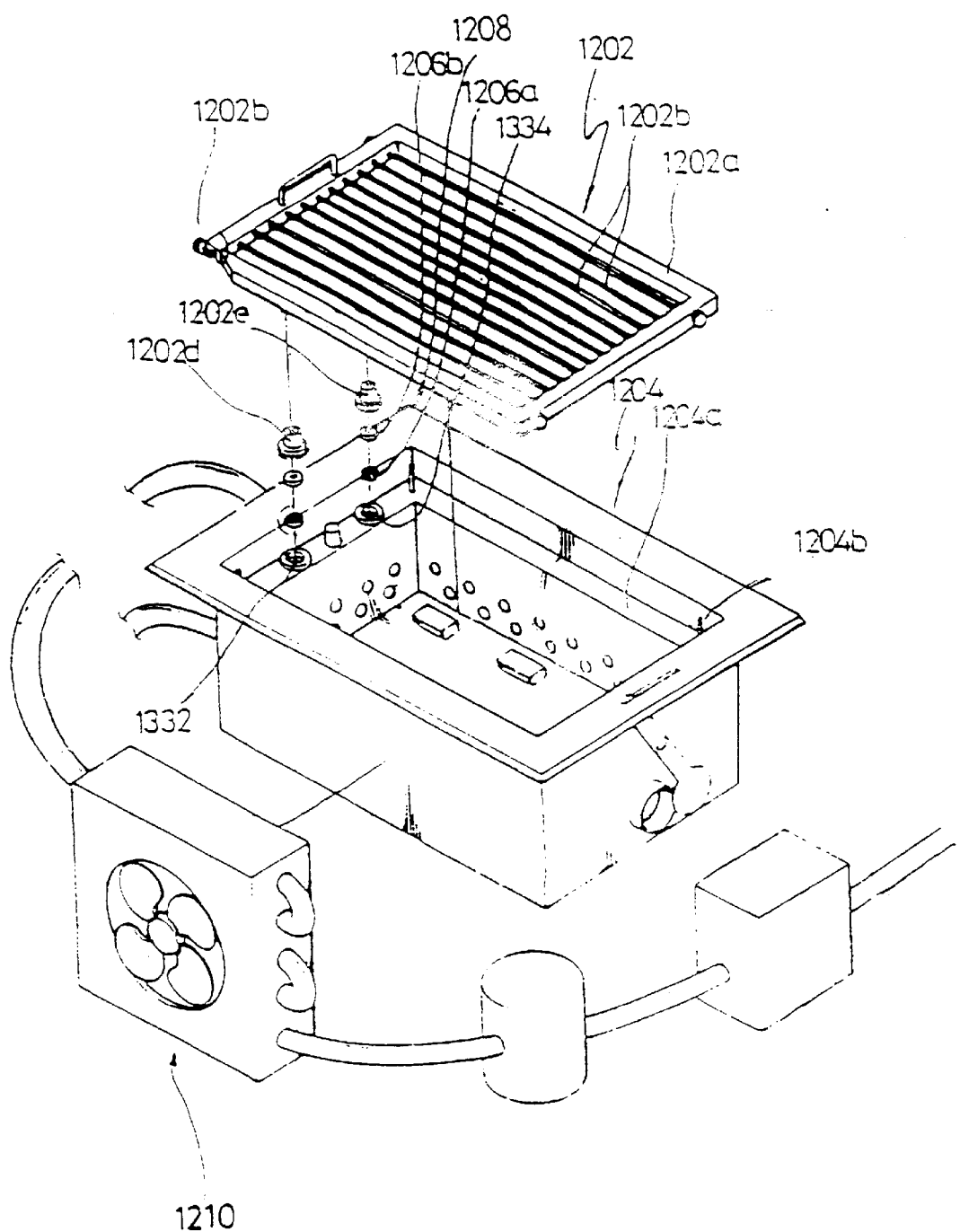
FIG. 12A is a plan view schematically showing a meat roaster according to a second embodiment of the present invention.

FIG. 12A is a plan view schematically showing a meat roaster 120 according to a second embodiment of the present invention. The meat roaster 120 includes a grill 1202, a body 1204, first and second connecting members 1206 and 1208, and a temperature controller 1210.

Figure 12B:
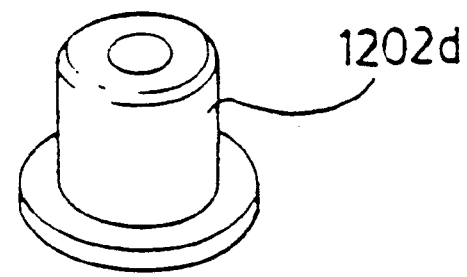
FIG. 12B is an enlarged detail for showing the inlet socket shown in FIG. 12A.

The grill 1202 includes a frame 1202a and a fluid circulating pipe 1202b. The frame 1202a has a plurality of guiding members 1202c formed at lower corners thereof. The fluid circulating pipe 1202b is mounted at one side of the frame 1202a in such a manner that the pipe 1202b is repeatedly bent at an regular intervals. FIG. 12B is an enlarged perspective view of the inlet socket 1202d shown in FIG. 12A. The pipe 1202b has inlet and outlet sockets 1202d and 1202e formed at one and other ends thereof, respectively.

Figure 12C:
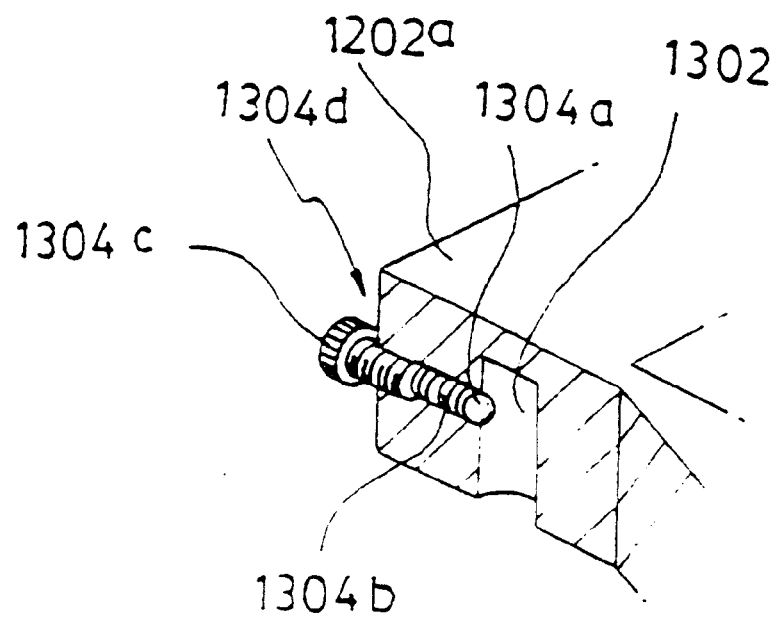
FIG. 12C is an enlarged detail of one of the guiding members shown in FIG. 12A.
Figure 12D:
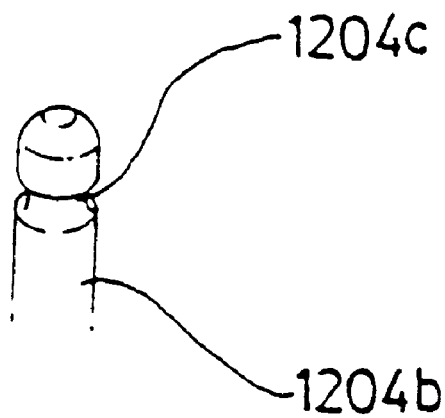
FIG. 12D is an enlarged detail of a guide rod shown in FIG. 12A.

FIG. 12C is an enlarged detail of one of the guiding members 1202b shown in FIG. 12A. The guiding member 1202c includes a coupling portion 1302 and a detach preventing member 1304. The coupling portion 1302 is formed on the lower surface of the frame 1202a so that each of the guide rods 1204b is coupled to the coupling portion 1302. The detach preventing member 1304 is formed perpendicularly to the coupling portion 1302 and prevents each of the guide rods 1204b coupled to the coupling portion 1302 from detaching. The body 1204 includes an accommodating portion 1204a and a guide rod 1204b. The accommodating portion 1204a accommodates the grill 1202 and a heat source (not shown). FIG. 12D is an enlarged detail of one of the guide rods 120b shown in FIG. 12A. Four guide rods 1204b are vertically fixed on each corner of the accommodating portion 1204a. Each of the guide rods 1204b has a groove 1204c formed on an outer wall thereof.

Figure 12E:
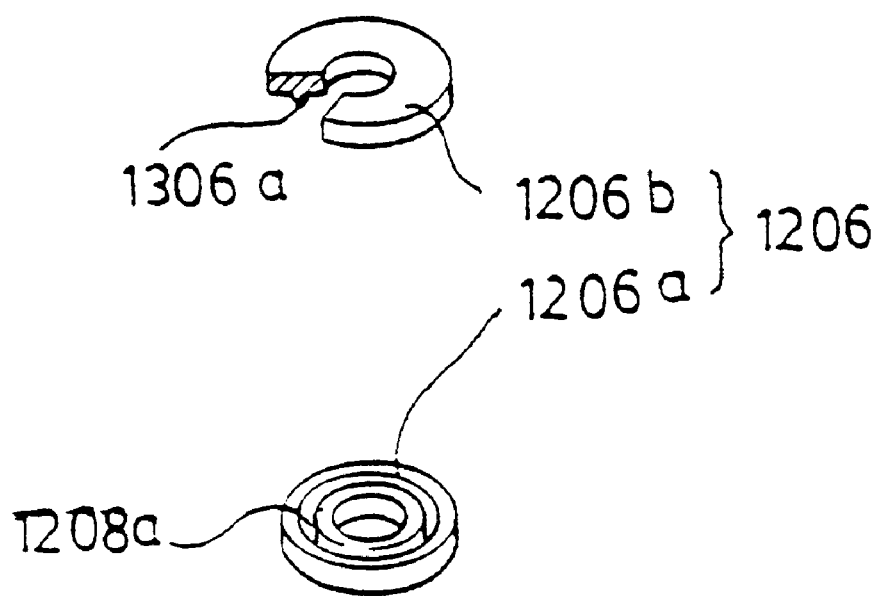
FIG. 12E is an enlarged perspective view of the first connecting members 1206 shown in FIG. 12A.
Figure 13A:
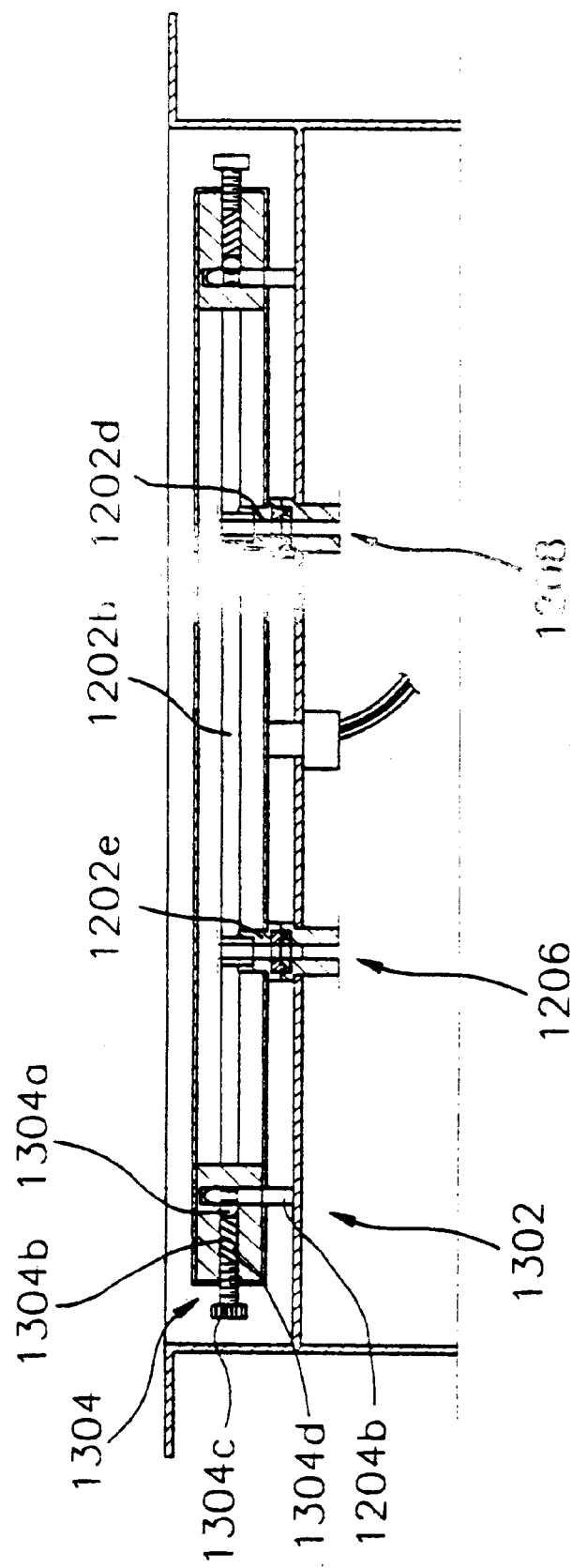
FIG. 13A is a sectional view for showing a connecting state of a body and a grill by the connecting members and the guiding members.
Figure 13B:
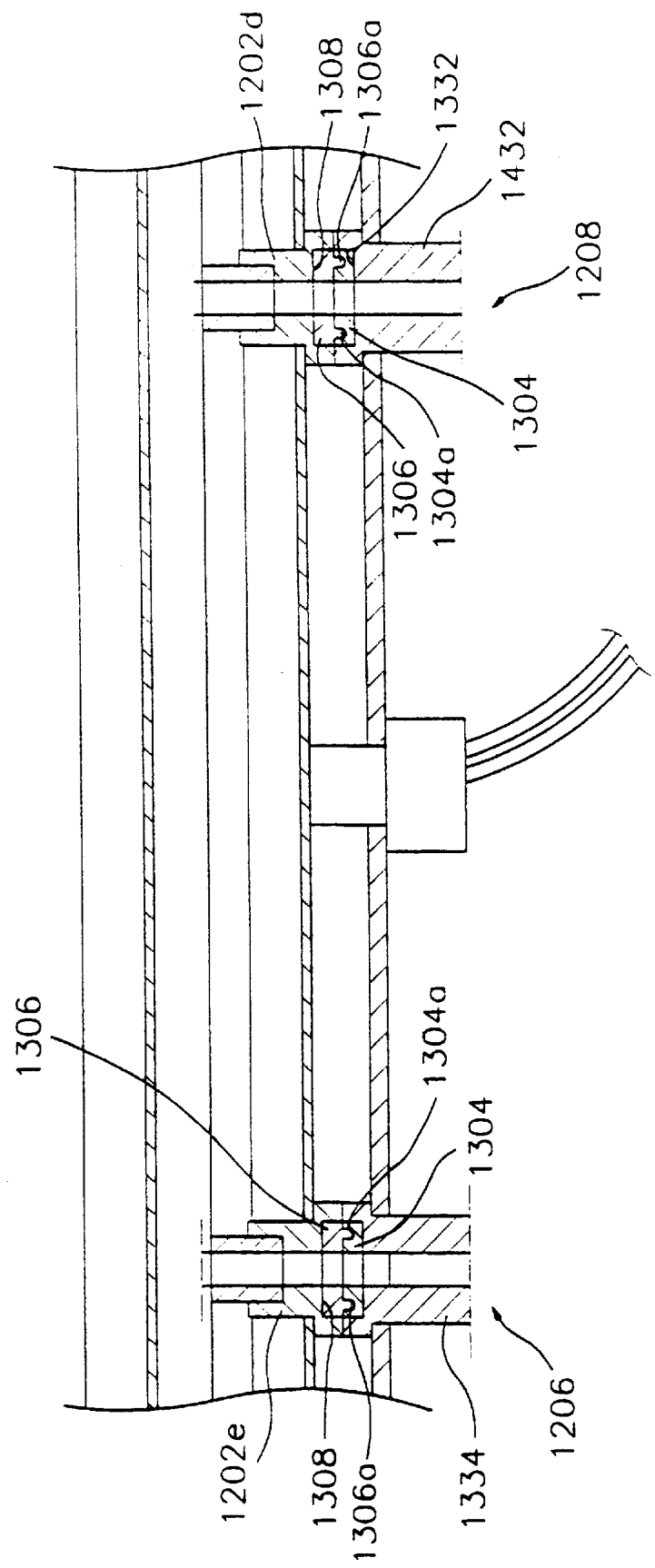
FIG. 13B is an enlarged detail of the first and second connecting members shown in FIG. 13A.

FIG. 12E is an enlarged perspective view of the first connecting members 1206 shown in FIG. 12A. The first and second connecting members 1206 and 1208 are connected to one ends of inlet and outlet hoses 1212 and 1214 connects the grill 1202 to the body 1204, respectively. FIG. 13A is a sectional view for showing a connecting state of the grill 1202 and body 1204 by the guiding members 1202c and the connecting members 1206 and 1208. FIG. 13B is an enlarged detail of the first and second connecting members 1206 and 1208 shown in FIG. 13A. Each of the first and second connecting members 1206 and 1208 includes a first groove 1302, a first connector 1304, a second connector 1306, and a second groove 1308. The first groove 1302 is formed on an upper surface of one of inlet and outlet ports 1332 and 1334. The first connector 1304 is inserted into the first groove 1302 and has an annular groove 1304a formed on an upper surface of the accommodating portion 1204a. The second connector 1306 has an annular projection 1306a formed on one surface thereof. The second groove 1308 is formed on a lower surface of one of the inlet and outlet sockets 1202d and 1202e so that the other surface of the second connector 1306 is inserted into the second groove 1308.

The temperature controller 1210 controls the fluid circulating through the pipe at a predetermined temperature. The temperature controller 1210 includes a heat exchanger 1210a, a tank 1210b, a pump 1210c, a cooling blower 1210d, a temperature sensor 1210e, and a lamp 1210f. The configurations and functions of a hear exchanger 1210a, a tank 1210b, a pump 1210c, a cooling blower 1210d, and a temperature sensor 1210e are the same as those of a heat exchanger 322, a tank 324, a pump 326, a cooling blower 328, and a temperature sensor 330, respectively.

EMBODIMENT 3

Figure 14:
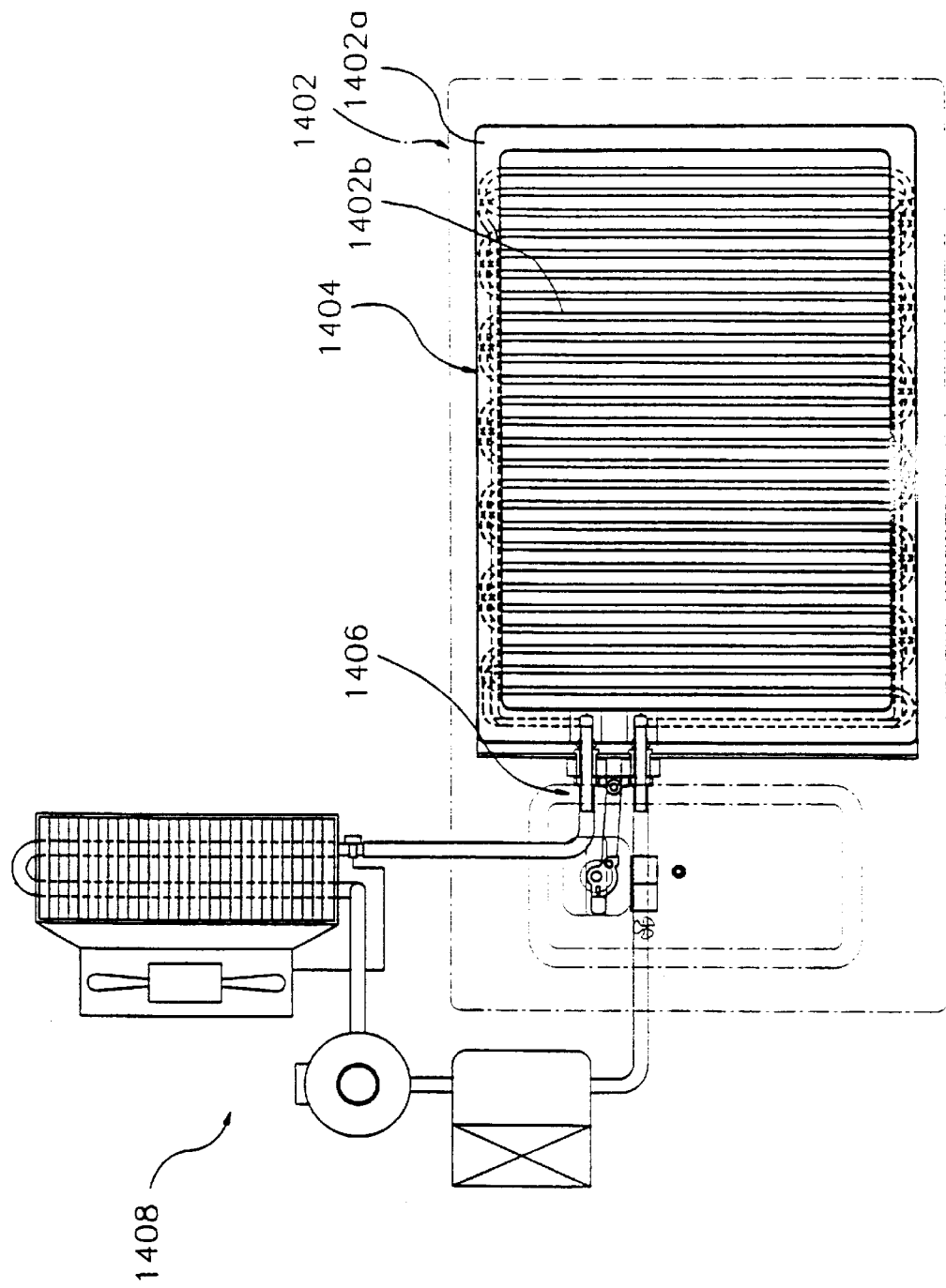
FIG. 14 is a plan view schematically showing a meat roaster according to a third embodiment of the present invention.

FIG. 14 is a plan view of schematically showing a meat roaster 1400 according to a third embodiment of the present invention. The meat roaster 1400 includes a grill 1602, a body 1404, an attaching member 1406, and a temperature controller 1408. The grill 1402 includes at least one heat plate 1402a and a fluid circulating pipe 1402b.

Figure 15A:
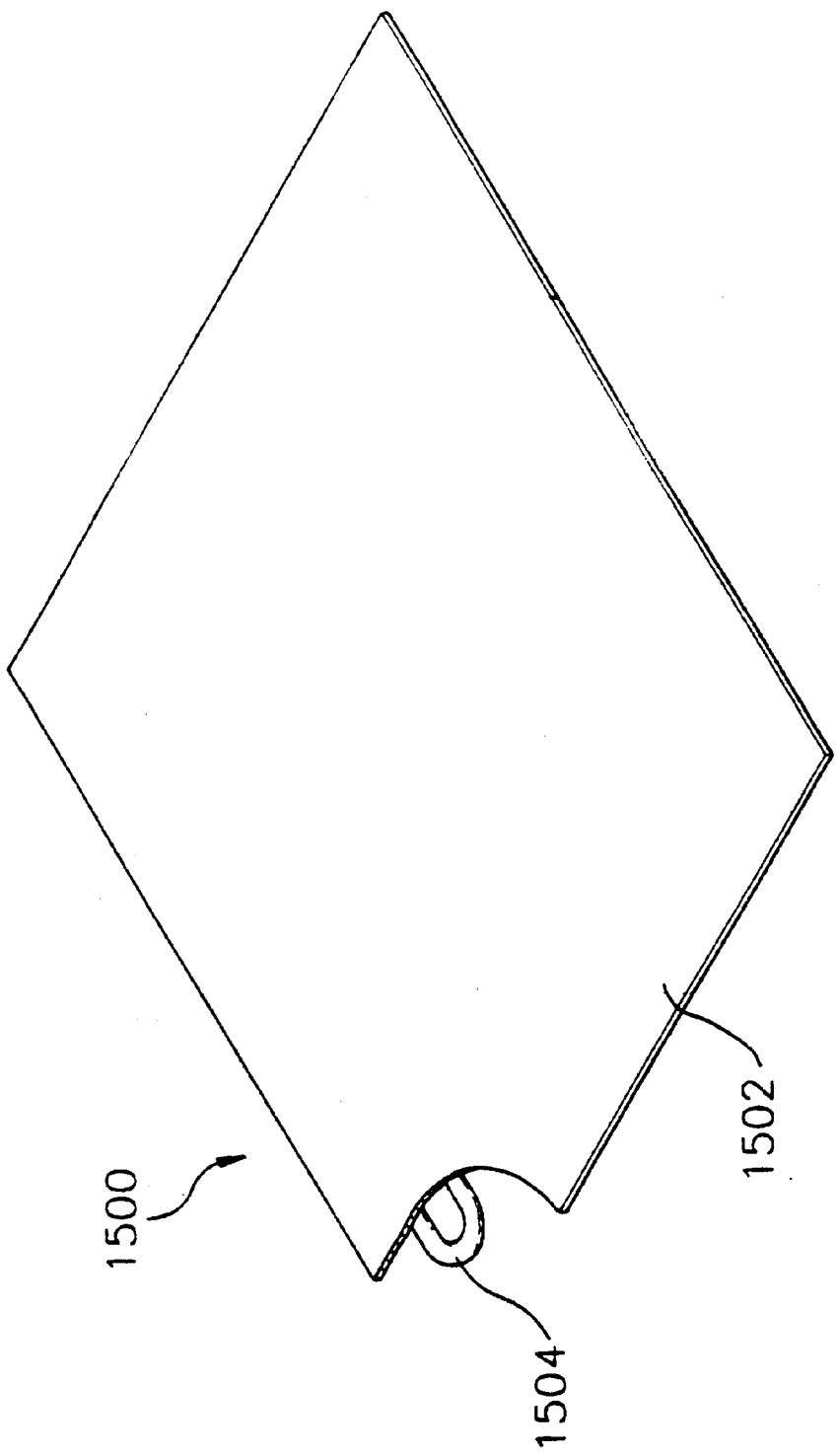
FIGS. 15A through 31B are views showing other examples shown in FIG. 14.
Figure 15B:
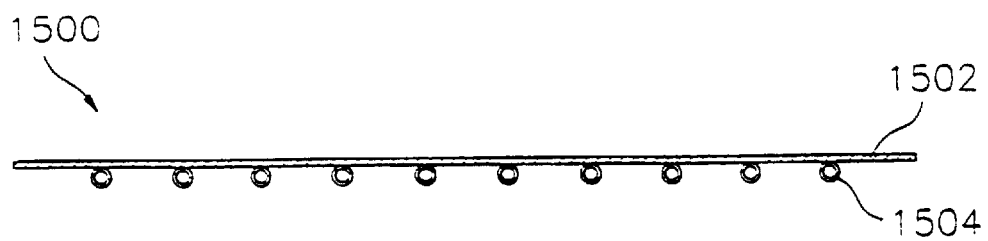
Figure 15C:
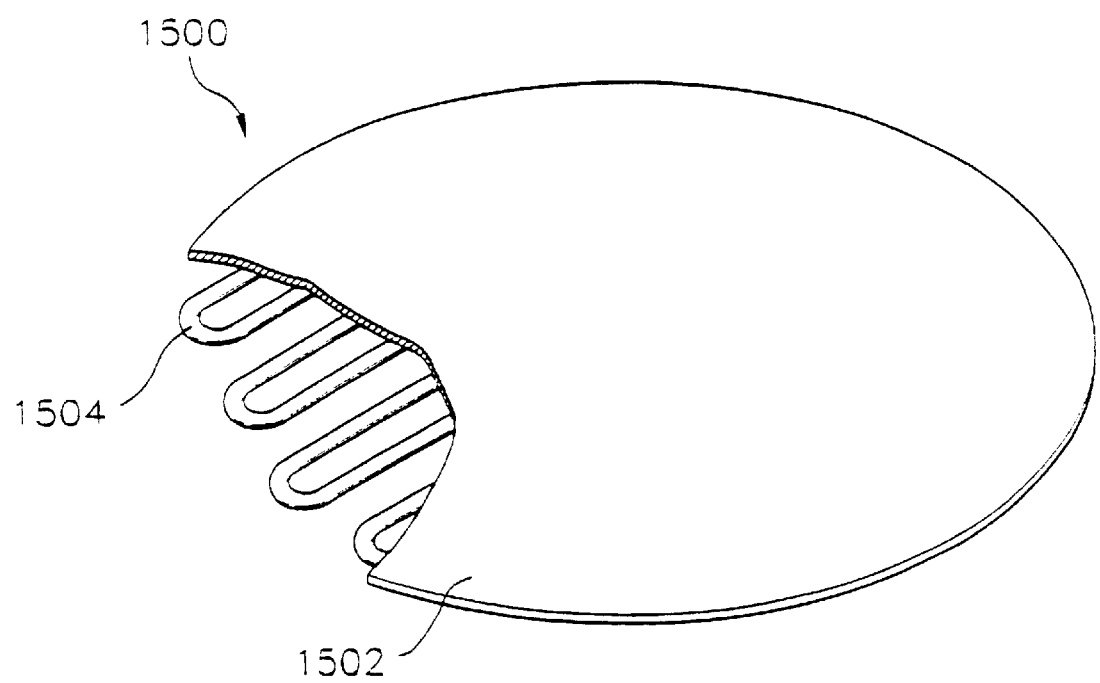
Figure 16:
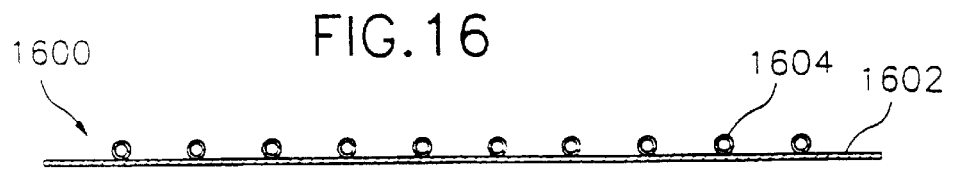
Figure 17:
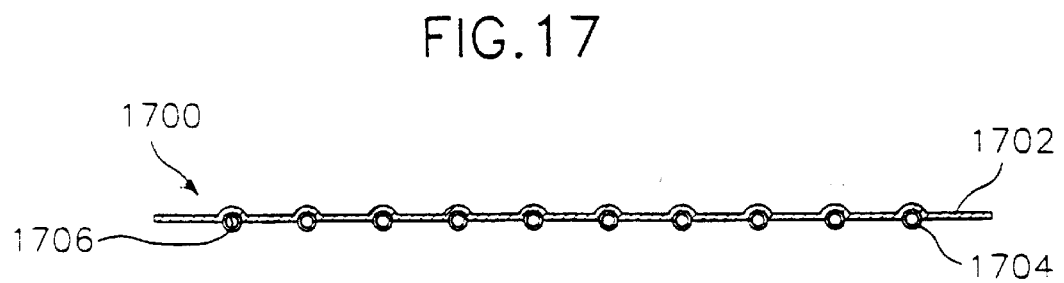

Referring to FIGS. 15A and 15B, the grill 1500 includes a heat plate 1502 disposed apart from a heat source by a predetermined distance and a fluid circulating pipe 1504 mounted on a lower surface of the heat plate 1502. Referring to FIG. 16, the grill 1600 includes a heat plate 1602 disposes apart from a heat source at a predetermined distance and a fluid circulating pipe 1604 mounted on a lower surface of the heat plate 1602. The heat plate 1602 has a groove 1606 formed on a lower surface thereof such a manner that the groove 1606 is repeatedly bent at an regular intervals so that the fluid circulating pipe 1602 is inserted into the groove 1606. Referring to FIG. 17, The grill 1700 includes a heat plate 1702 disposed apart from a heat source at a predetermined distance and a fluid circulating pipe 1704 mounted on an upper surface of the heat plate 1702.

Figure 18:
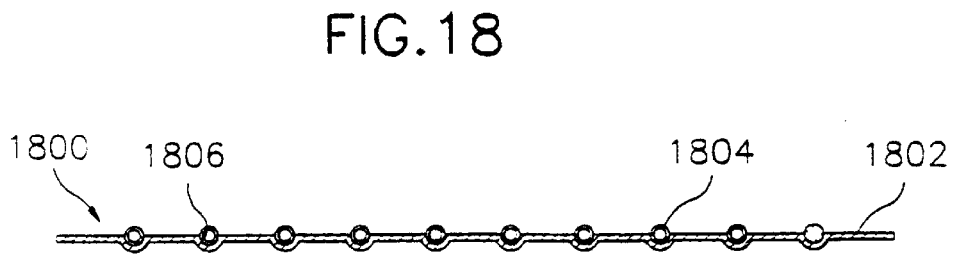
Figure 19:
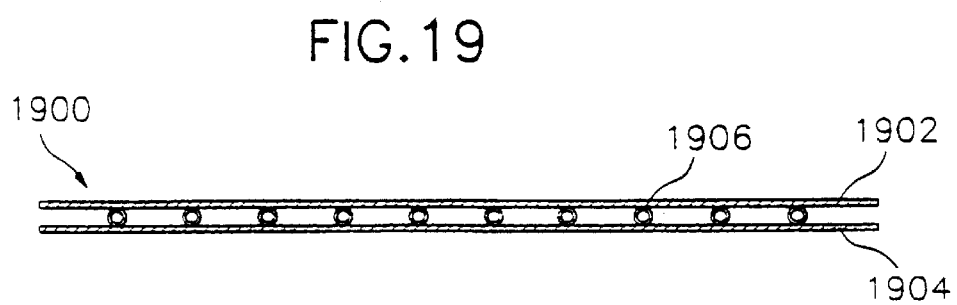
Figure 20:
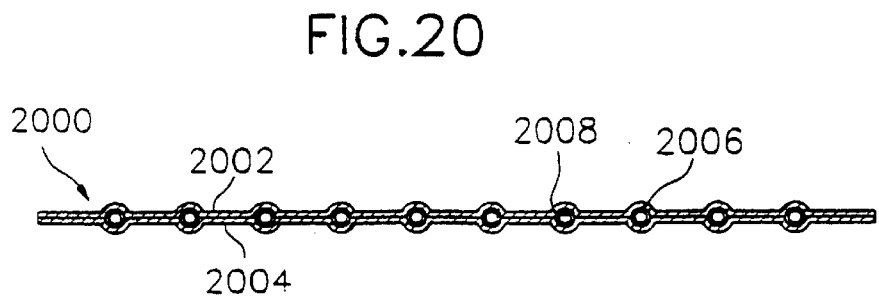

Referring to FIG. 18, the grill 1800 includes a heat plate 1802 disposed apart from a heat source at a predetermined distance and a fluid circulating pipe 1804 mounted on an upper surface of the heat plate 1802. The heat plate 1802 has a groove 1806 formed on an upper surface thereof in such a manner that the groove 1806 is repeatedly bent at regular intervals so that the fluid circulating pipe 1804 is inserted into the groove 1806. Referring to FIG. 19, the grill 1900 includes first and second heat plates 1902 and 1904 disposed apart from a heat source by a predetermined distance and a fluid circulating pipe 1904 mounted between the first and second, heat plates 1902 and 1904. Referring to FIG. 20, the grill 2000 includes first and second heat plates 2002 and 2004 disposed apart from a heat source at a predetermined distance and a fluid circulating pipe 2006 mounted between the first and second heat plates 2002 and 2004. The first and second heat places 2002 and 2004 have a groove 2008 formed between the heat plates 2002 and 2004 thereof in such a manner that the groove 2006 is repeatedly bent at regular intervals so that the fluid circulating pipe 2006 is inserted into the groove 2008.

Figure 21A:
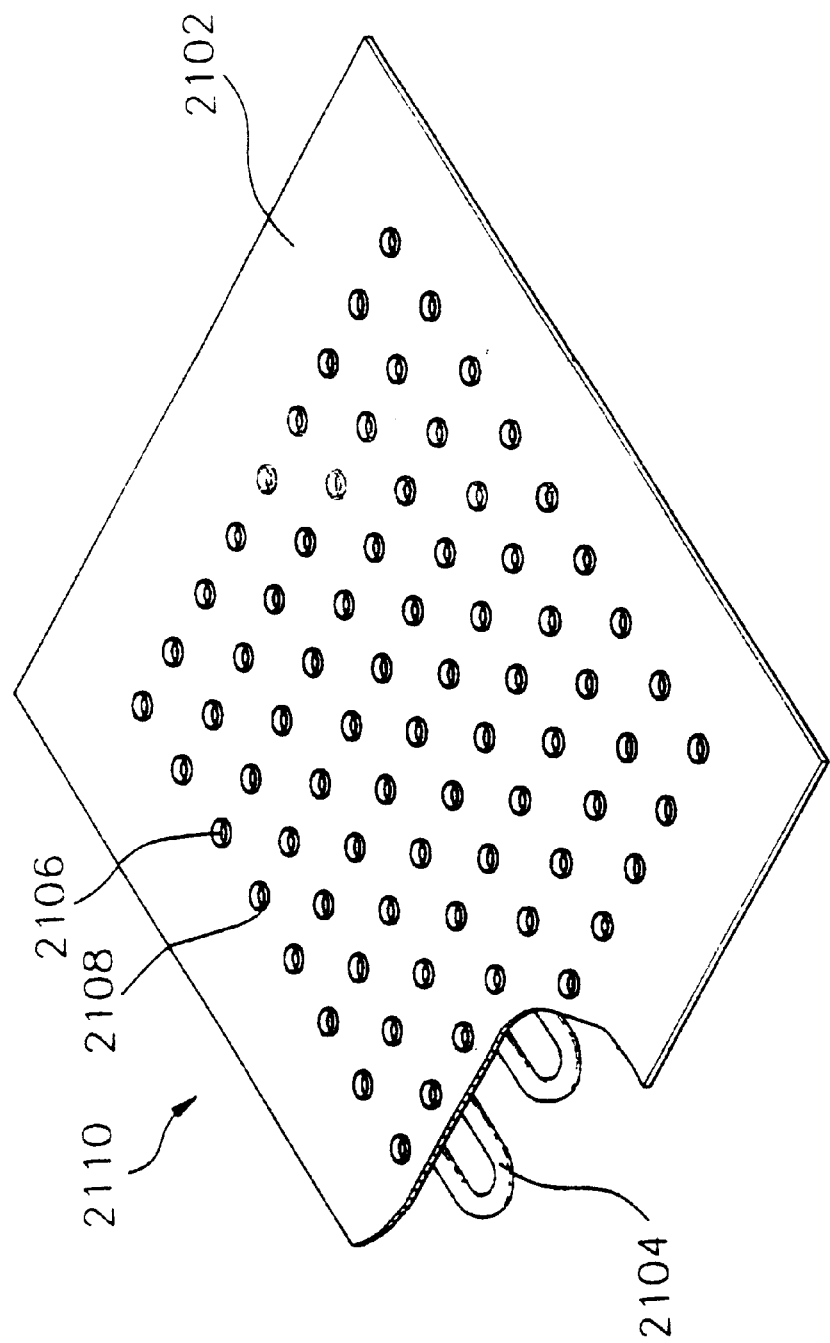
Figure 21B:
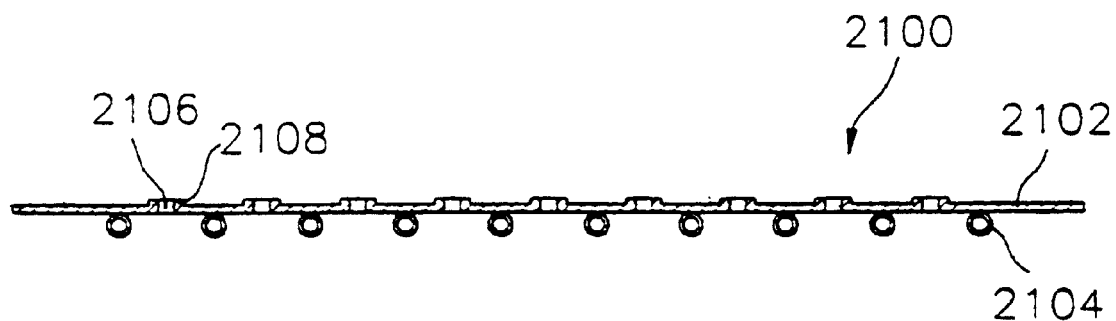
Figure 21C:
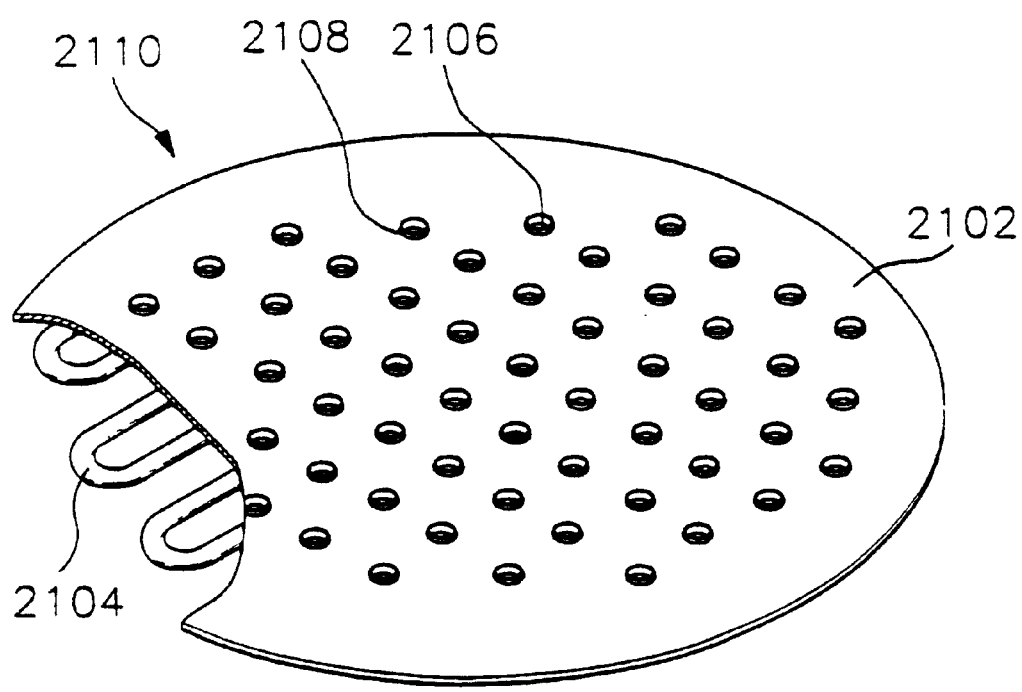

Referring to FIGS. 21A, 21B, and 21C, the grill 2100 includes a heat plate 2102 disposed apart from a heat. source at a predetermined distance and a fluid circulating pipe 2104 mounted on a lower surface of the heat plate 2102. The heat plate 2102 has a hole 2106 formed perpendicularly thereto and a hook 2108 formed at an outer side of the hole 2106. The heat plate 2102 has a square or round shape as shown in FIGS. 21A, 21B, and 21C.

Figure 22:
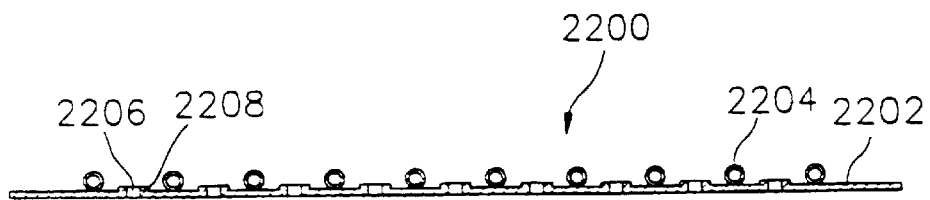
Figure 23:
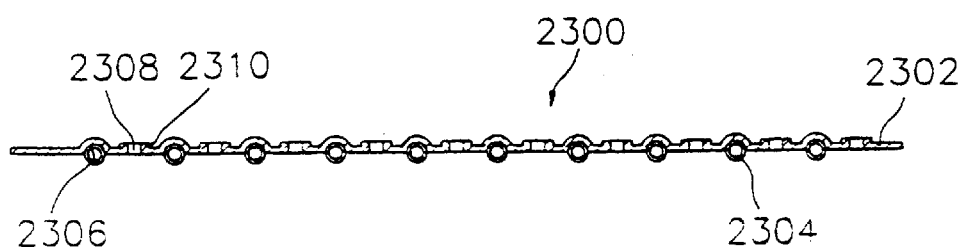

Referring FIG. 22, The grill 2200 includes a heat plate 2202 disposed apart from a heat source by a predetermined distance and a fluid circulating pipe 2204 mounted on a lower surface of the heat plate 2202. The heat plate 2202 has a groove 2206 formed on a lower surface thereof in such a manner that the groove 2206 is repeatedly bent at regular intervals so that the fluid circulating pipe 2204 is inserted into the groove 2406. The heat plate 2202 has a hole 2206 formed perpendicularly thereto and a hook 2208 formed at an outer side of the hole 2206. Referring to FIG. 23, the grill 2300 includes a heat plate 2302 disposed apart from a heat source at a predetermined distance and a fluid circulating pipe 2304 mounted on an upper surface of the heat plate 2302. The heat plate 2302 has a hole 2306 formed perpendicularly thereto and a hook 2308 formed at an outer side of the hole 2306.

Figure 24:
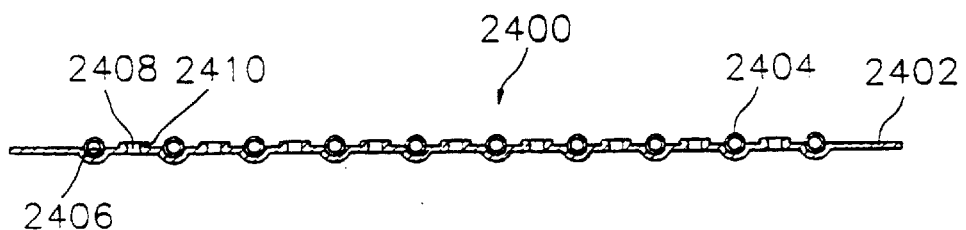
Figure 25:
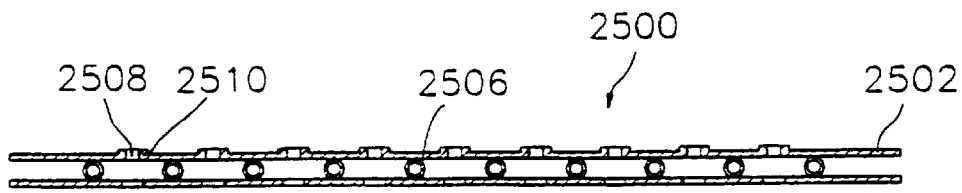
Figure 26:
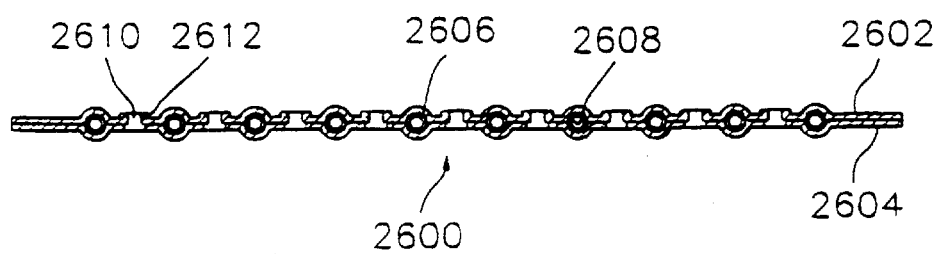

Referring to FIG. 24, the grill 2400 includes a heat plate 2402 disposed apart from a heat source by a predetermined distance and a fluid circulating pipe 2404 mounted on an upper surface of the heat plate 2402. The heat plate 2402 has a groove 2406 formed on a upper surface thereof in such a manner that the groove 2406 is repeatedly bent at regular intervals so that the fluid circulating pipe 2404 is inserted into the groove 2406. The heat plate 2402 has a hole 2406 formed perpendicularly thereto and a hook 2408 formed at an outer side of the hole 2306. Referring to FIG. 25, the grill 2502 includes first and second heat plates 2502 and 2504 disposed apart from a heat source at a predetermined distance and a fluid circulating pipe 2506 mounted between the first and second heat places 2502 and 2504. The first and second heat plate 2502 and 2504 have a hole 2508 formed perpendicularly thereto and a hook 2510 formed at an outer side of the hole 2506. Referring FIG. 26, the grill 2600 includes first and second heat places 2602 and 2604 disposed apart from a heat source by a predetermined distance and a fluid circulating pipe 2606 mounted between the first and second heat plates 2602 and 2604. The first and second heat plates 2602 and 2604 have a groove 2808 formed between the heat plates 2602 and 2604 thereof in such a manner that the groove 2606 is repeatedly bent at regular intervals so that the fluid circulating pipe 2606 is inserted into the groove 2608. The first and second heat plates 2602 and 2604 have a hole 2610 formed perpendicularly thereto and a hook 2612 formed at an outer side of the hole 2606.

Figure 27B:
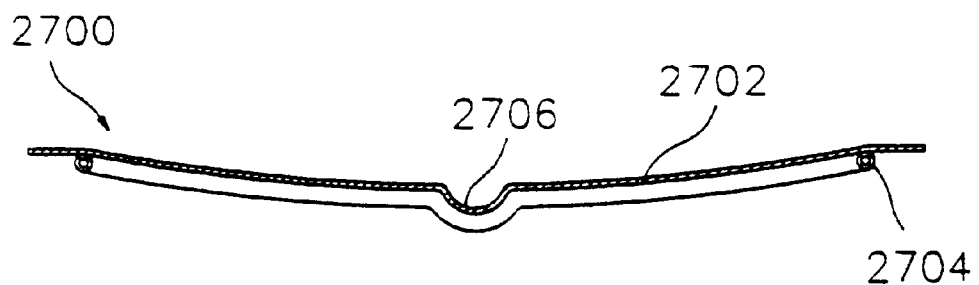
Figure 27C:
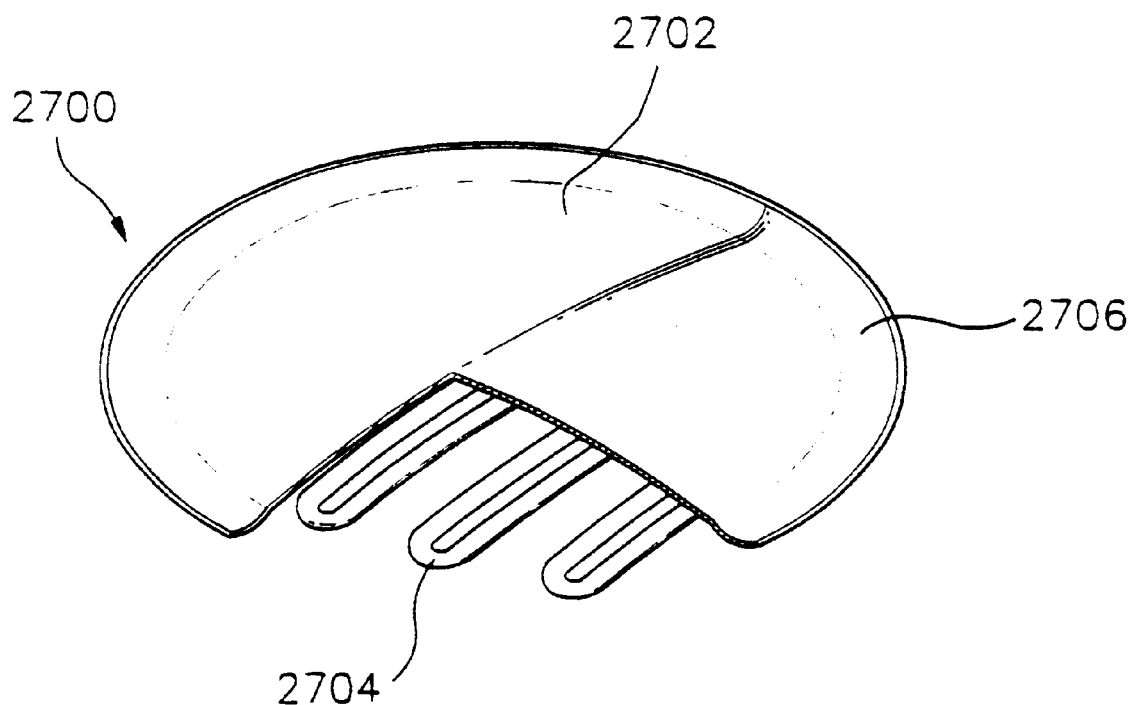
Figure 28:
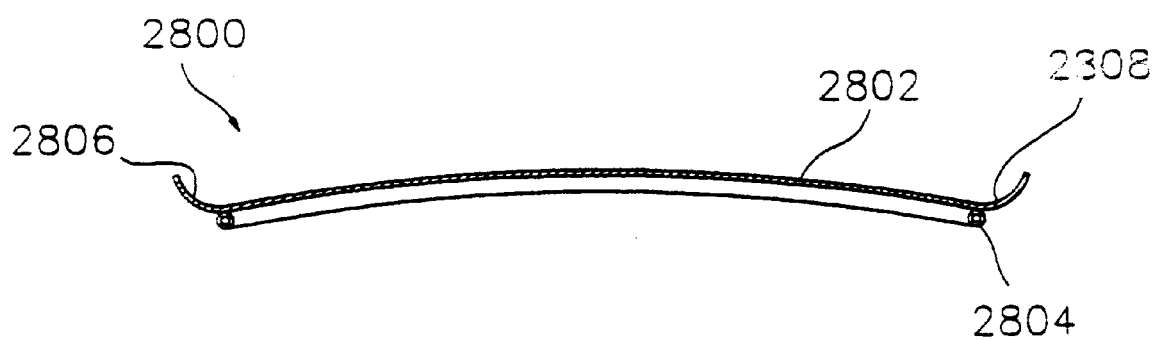

Referring to FIGS. 27A, 27B, and 27C, the grill 2700 includes heat plates 2702 disposed apart from a heat source at a predetermined distance and a fluid circulating pipe 2704 mounted on a lower surface of the heat plate 2702. The heat plate 2702 includes a receiving path 2706 longitudinally formed on a middle of an upper surface thereof. Referring to FIG. 28, the grill 2800 includes a heat plate 2802 disposed apart from a heat source at a predetermined distance and a fluid circulating pipe 2802 mounted on a lower surface of the heat plate 2802. The heat plate 2802 includes first and second receiving paths 2806 and 2808 longitudinally formed on both-sides of an upper surface thereof.

Figure 29A:
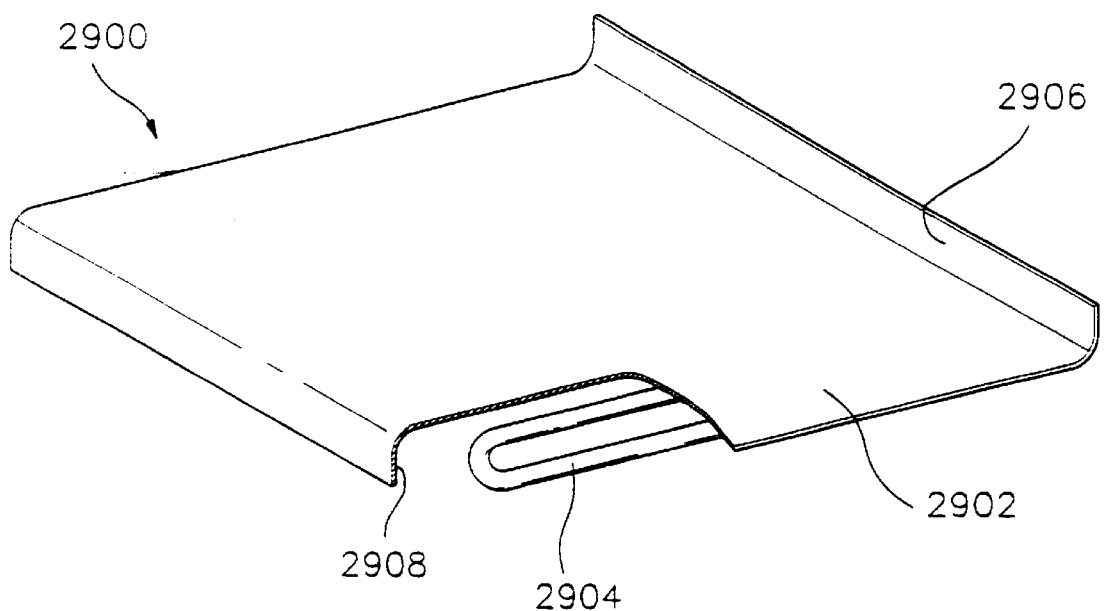
Figure 29B:
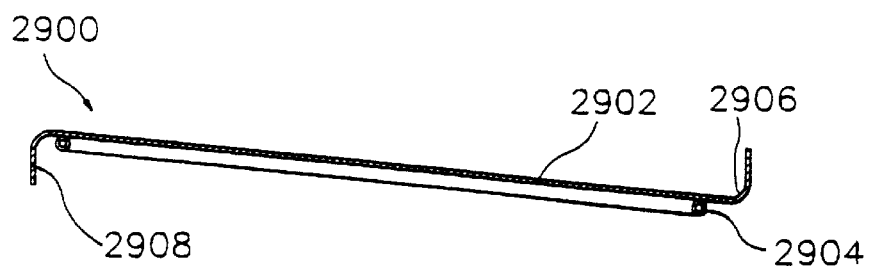
Figure 29C:
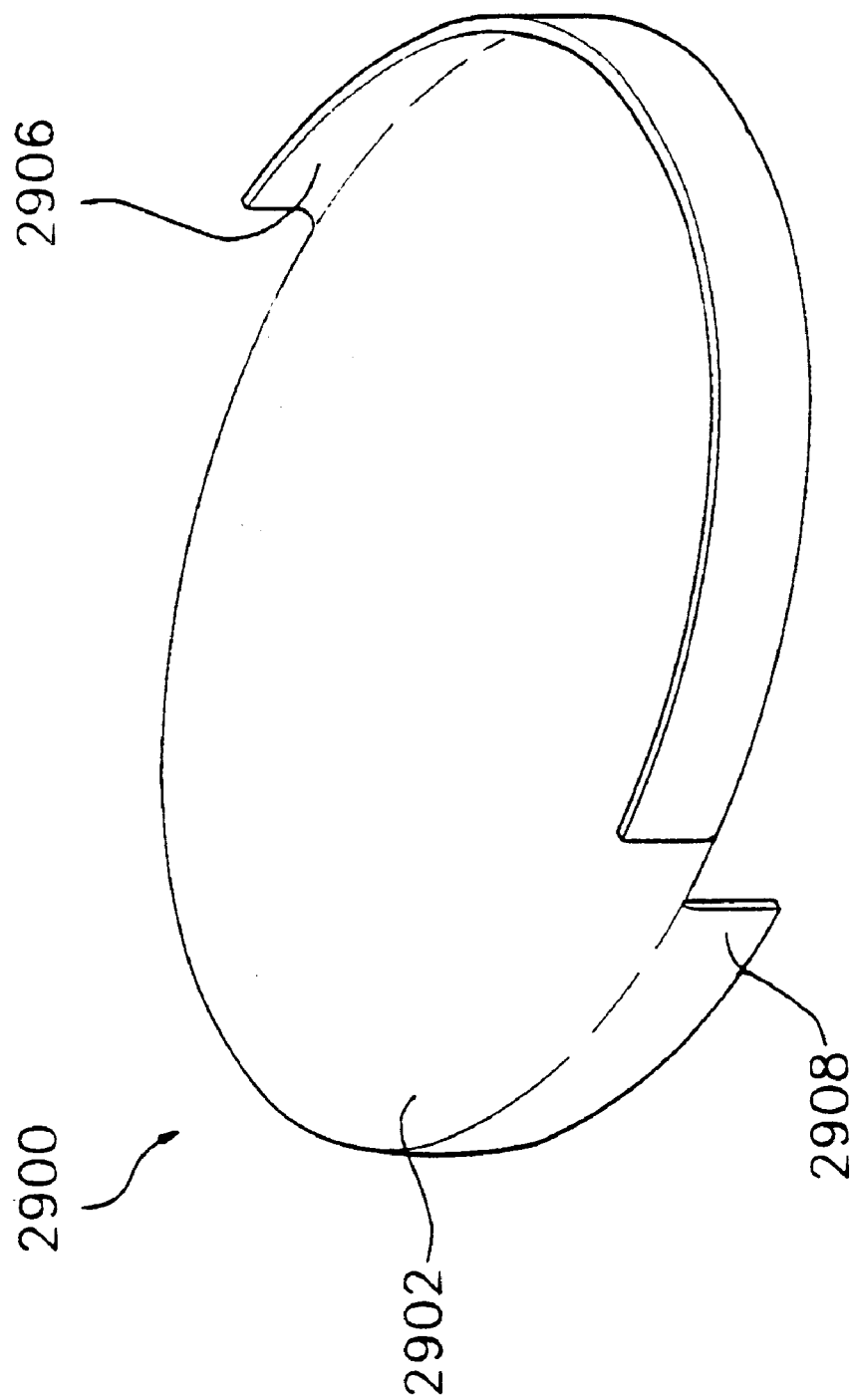

Referring to FIGS. 29A, 29B, and 29C, the grill 2900 includes a heat plates 2902 disposed apart from a heat source at a predetermined distance and a fluid circulating pipe 2902 mounted on a lower surface of the heat plate 2902. The heat plate 2902 includes a receiving paths 2906 longitudinally formed on one side of an upper surface thereof. The heat plate 2902 also includes a flange extending outwardly on the other side thereof. The heat place 2902 has a square or round shape as shown in FIGS. 29A, 29B, and 29C.

Figure 30A:
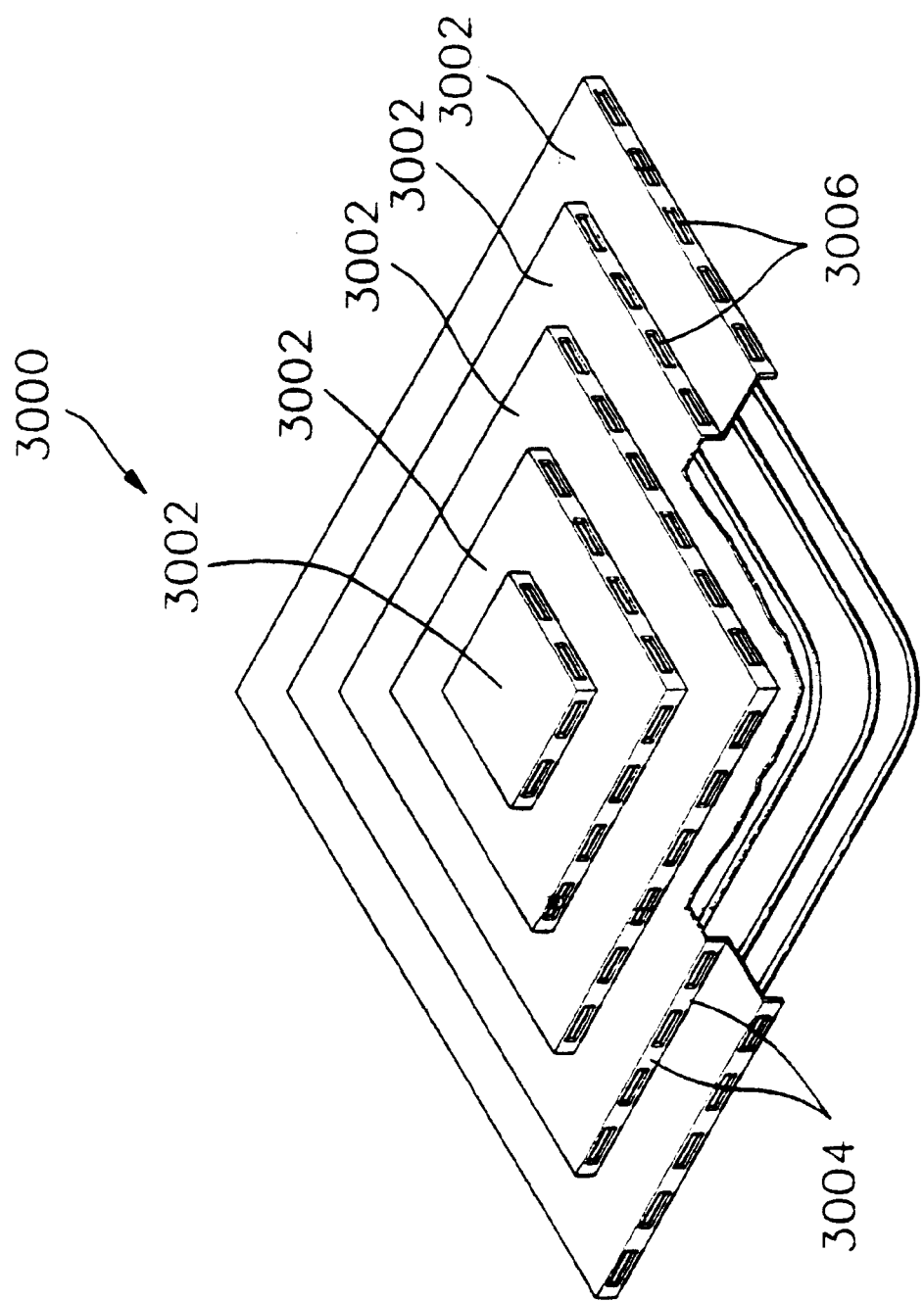

Referring to FIGS. 30A and 30B, the heat plate 3000 includes a plurality of horizontal portions which are arranged highest to lowest in an order from a center to an edge thereof and a plurality of vertical walls between the horizontal portions having a plurality of holes formed at predetermined intervals. The heat place 3002 has a square or round shape as shown in FIGS. 30A and 30B.

Figure 31A:
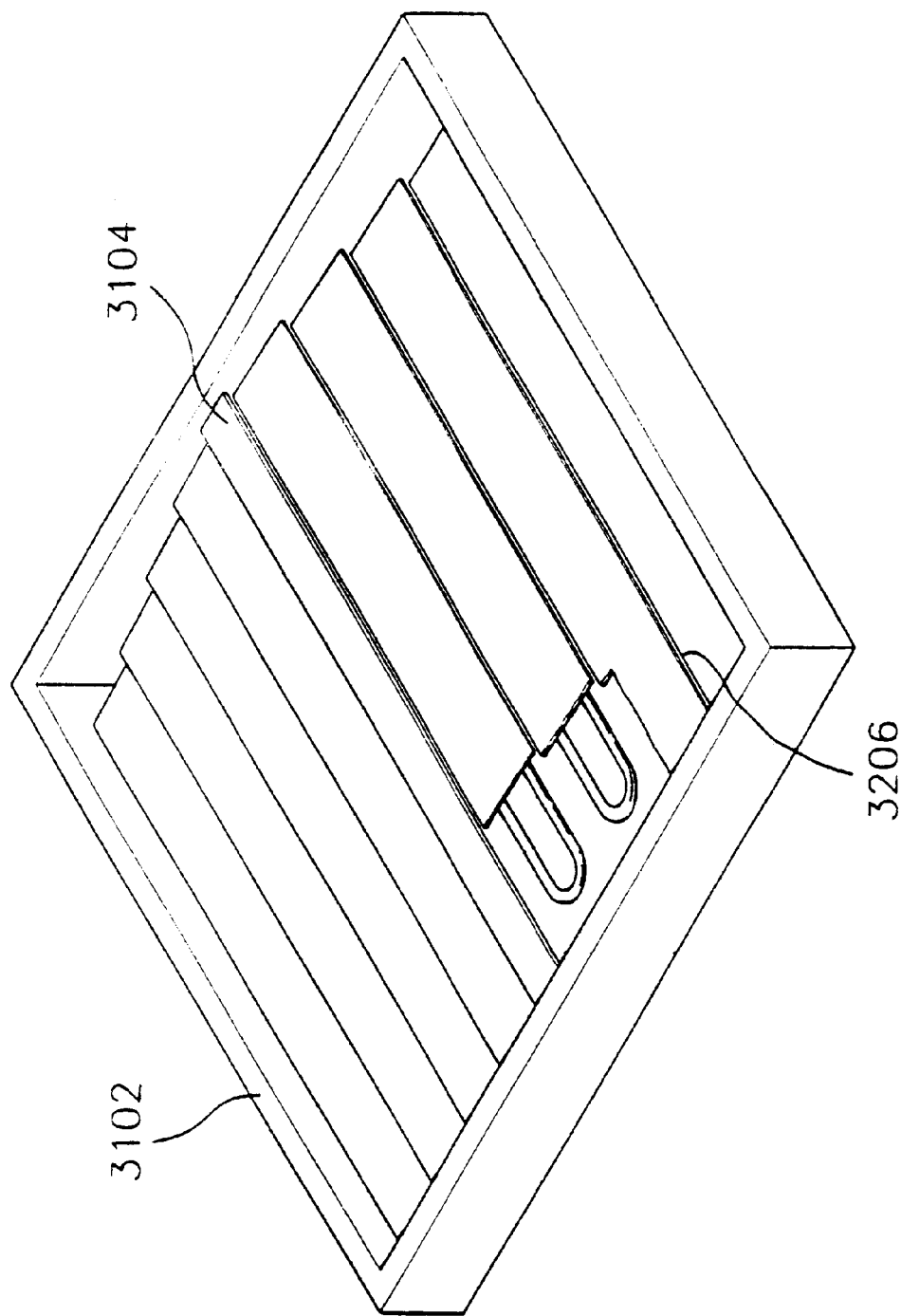
Figure 31B:
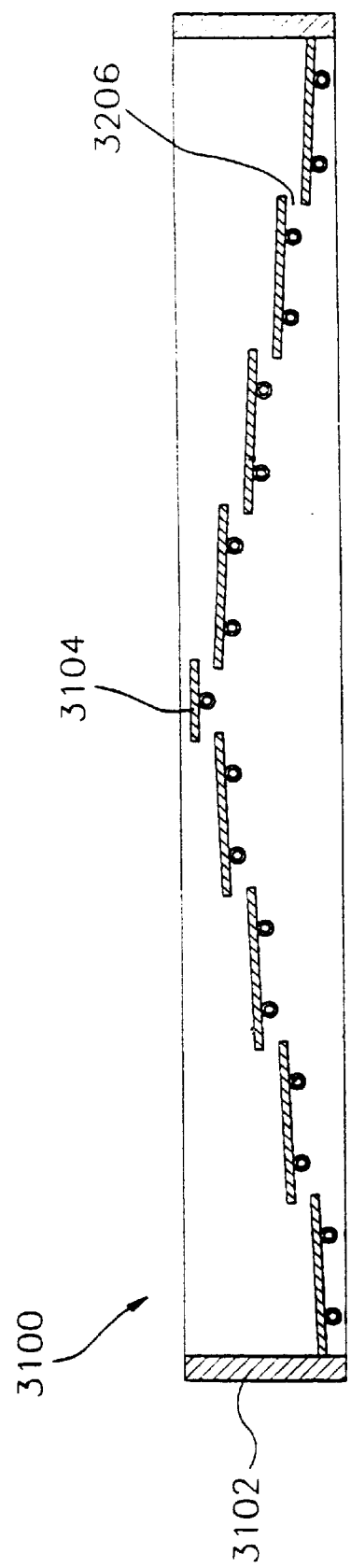

Referring to FIGS. 31A and 31B, the heat plate 3100 includes a frame 3102 and a plurality of horizontal plates 3104 highest to lowest in an order from a center to both sides thereof. A plurality of holes 3206 are formed between the horizontal plates 3104.

EMBODIMENT 4

Figure 32:
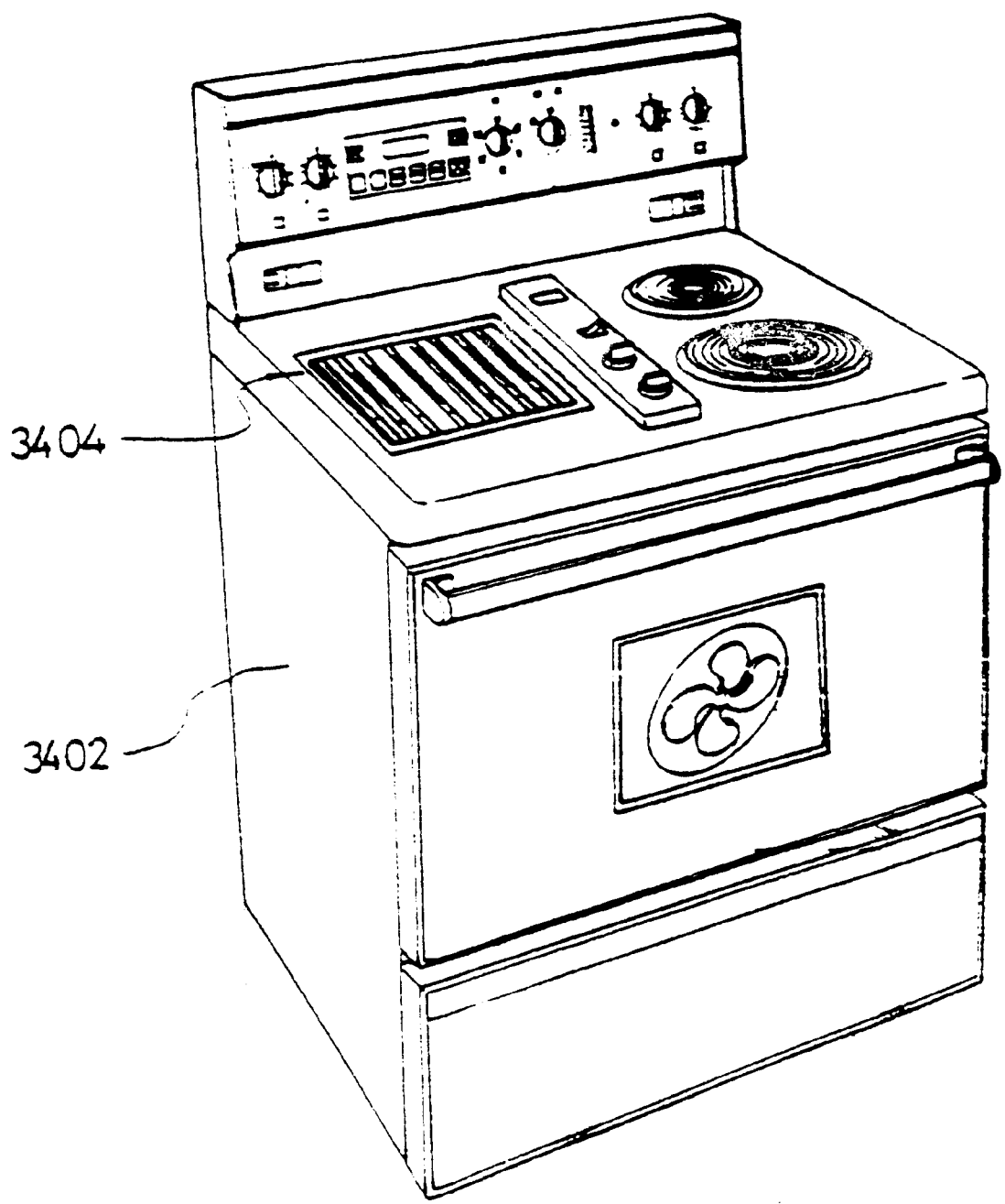
FIG. 32 is a perspective view for showing an oven range according to a fourth embodiment of the present invention.
Figure 33:
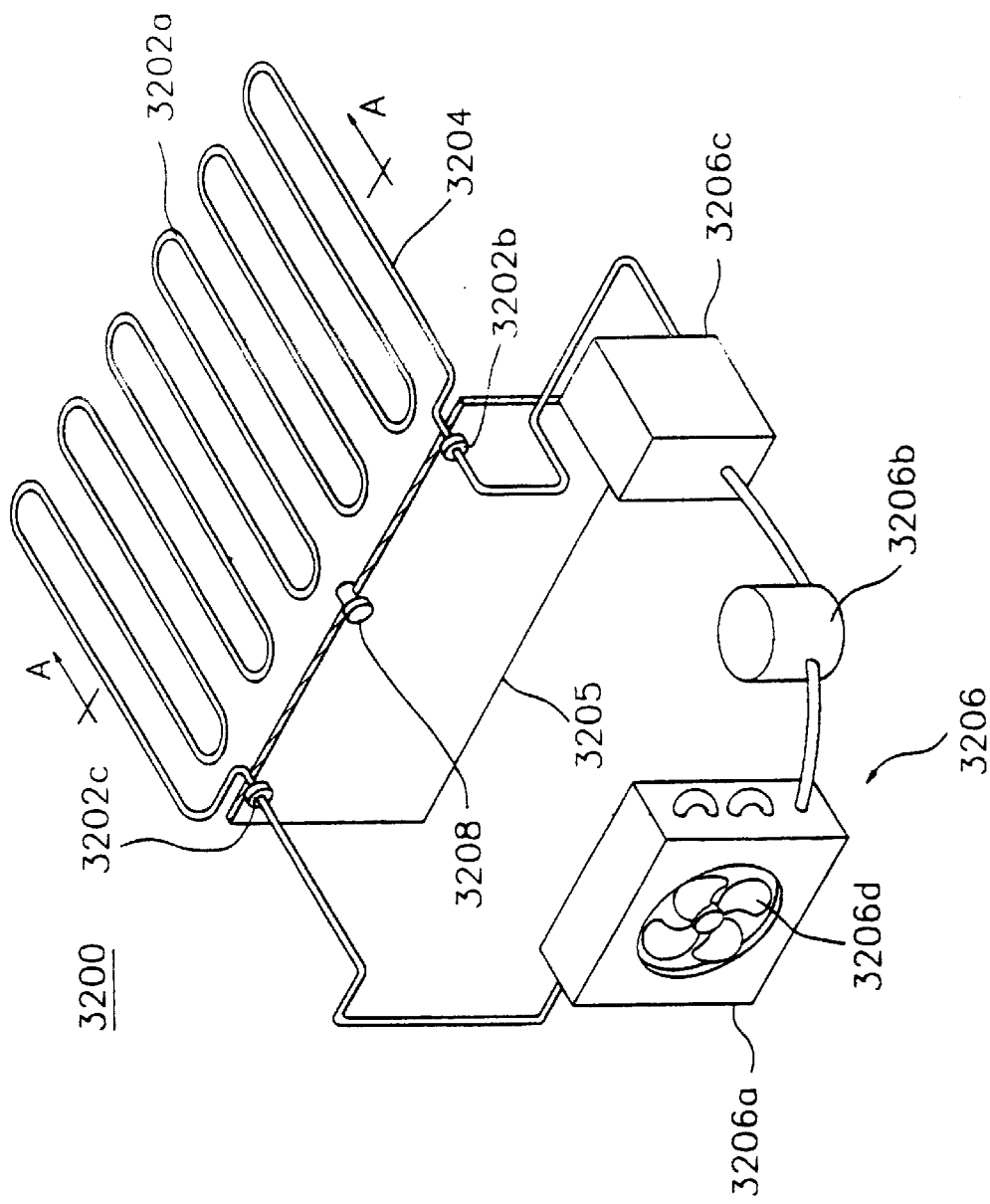
FIG. 33 is a partially perspective view of the oven range shown in FIG. 32.

FIG. 32 is a perspective view for showing an oven range 3200 according to a fourth embodiment of the present invention. FIG. 33 is a partially perspective view of the oven range 3200 shown in FIG. 32.

The oven range includes a body 3202, a rack 3204, a support member 3205, and a temperature controller 3206.

The rack 3204 includes a fluid circulating pipe 3204a. The pipe 3204a is mounted on an upper surface of the body 3023 in such a manner that the pipe 3204a is repeatedly bent at regular intervals. The pipe 3204a has inlet and outlet nipples 3204b and 3204c formed at one and another ends of the pipe 3204a, respectively. The support member 3205 is disposed under the entrance and exit of the pipe 3204a and supports the rack 3204. The temperature controller 3206 controls a fluid circulating through the pipe 3104a of the rack 3204 at a predetermined temperature. The temperature controller 3206 includes an heat exchanger 3206a, a tank 3206b, a pump 3206c, and a blower 3206d.

EMBODIMENT 5

Figure 34:
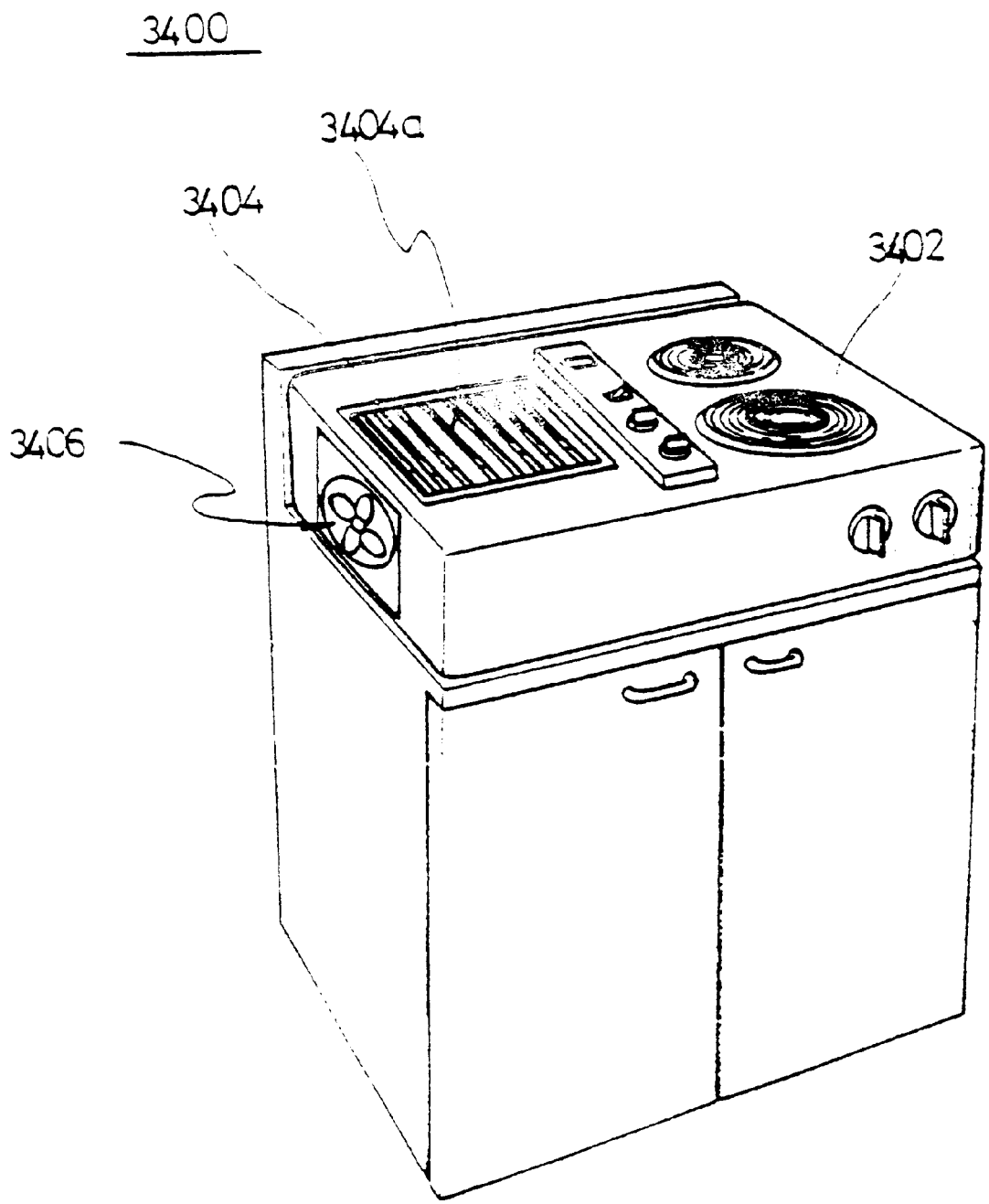
FIG. 34 is a perspective view for showing a gas range according to a fifth embodiment of the present invention.

FIG. 34 is a perspective view for showing a gas range 3400 according to a fifth embodiment of the present invention. The gas range 4000 includes a body 3402, a grill 3404, and a temperature controller 3406. The grill 3404 includes a fluid circulating pipe 3403a. The fluid circulating pipe 3404a is mounted on an upper surface of the body 3402 in such a manner that the pipe 3404a is repeatedly bent at regular intervals. The temperature controller 3406 controls a fluid circulating through the pipe 3404a of the grill 3404 at a predetermined temperature.

As mentioned above, the meat roaster according to the present invention circulates a cooling fluid through a fluid circulating pipe of a grill while cooking a meat to thereby prevent the grill from overheating. Thus, during cooking the meat, the meat which contacts with the grill is prevented from burning and from sticking to a grill. Therefore, the present invention controls a temperature of a fluid which cools the grill so that the meat can be prevented from burning. According to the present invention, it is easy to attach or detach the grill to and from a body. Since the present invention can use a heat source effectively, cooking time can be reduced and the heat source can be used for a long time.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description and all changes which come within the meaning and range of equivalency of the claims are therefore intended to be embraced therein.

What is claimed is:

1. A meat roaster, said roaster comprising:
   a body including an accommodating portion for accommodating a heat source;
   a grill connected to the body including a frame and a fluid circulating pipe, the pipe being mounted at one side of the frame in such a manner that the pipe is repeatedly bent at regular intervals and having an inlet socket formed at one end of the pipe and an outlet socket at the other end of the pipe; and
   a temperature controller for controlling a fluid circulating through the pipe of the grill at a predetermined temperature, wherein the temperature controller includes:
      a heat exchanger having a plurality of fins arranged in parallel at predetermined intervals on an outer surface of an outlet hose;
      a tank connected to the heat exchanger for storing a fluid to be circulated;
      a pump for pumping the fluid from the tank to the fluid circulating pipe through a first connecting hose, wherein the pump includes a driving motor, first and second installed portions fixed to both sides of the driving motor, a wire, both ends of the wire fixed to the first and second installed portions, a suspension portion, one end of the suspension portion inserted into the wire and the other end thereof has a hole, and a bracket including a projection on a lower surface thereof so that the projection is suspended by the hole of the suspension portion;
      a cooling blower for blowing cool air to the heat exchanger; and
      a temperature sensor for sensing a temperature of a fluid discharged from the pipe and controlling an operation of the cooling fan according to a sensing result.

2. The meat roaster as set forth in claim 1, wherein a temperature of the fluid circulating through the fluid circulating pipe is within 70 through 80° C.

3. The meat roaster as set forth in claim 1, wherein the temperature controller further includes a lamp turned on or off according to an operation of the pump.

4. The meat roaster as set forth in claim 1, further comprising an attaching member connected to one respective end of first and second hoses for attaching or detaching the grill to and from the body.

5. The meat roaster as set forth in claim 4, wherein the attaching member includes
   a first knob mounted on an upper surface of the body and having a hook at a lower end portion which is stepped;
   a bracket having a guide protruded downward at an inner middle side thereof and a fixed portion having an opening formed at a lower end thereof so that a lower portion of the knob passes through the opening of the bracket, an upper end of the bracket is fixed to a lower surface of the body;

a rotating plate having an operating member which is stepped and an opening formed at one side of the operating member;

a third spring for elastically pushing the rotating plate and knob;

a double link hingedly connected to the rotating plate;

a second connector hingedly connected to the double link;

first and second moving tubes attached or detached to and from the inlet and outlet sockets by an operation of the knob each having a projection formed on an outer surface thereof so that both ends of the connector are connected to the projection; respective one ends of the moving tubes being connected to the first and second hoses;

first and second bushes slidably inserted into the first and second moving tubes at one side of the accommodating portion of the body, respectively; and a switch mounted at an outer side of the bracket for turning on or turning off the temperature controller by motion of the operating member of the rotating plate, a lower terminal of the switch being fixed to the operating member.

6. The meat roaster as set forth in claim 4, wherein the attaching member includes first and second connectors mounted at one end of the inlet and outlet hoses, respectively, the connectors being attached or detached to and from the pipe;

a moving bar for vertically connecting one end sides of the connectors to each other;

a first fixed bar arranged parallel to the moving bar for vertically connecting the other end sides of the connectors;

a plurality of second fixed bars for vertically connecting the moving bar and first fixed bar;

a link pivotally connected to a middle portion of the moving bar;

an arm hinged to one end of the link;

a first knob rotatably mounted at the body, a center of the knob being fixed to the arm;

first and second balls disposed inside the pipe for opening or closing the pipe; and first and second springs for elastically pushing the inlet and outlet balls in directions of the first and second hoses, respectively.

7. The meat roaster as set forth in claim 1, further comprising a heating power controller connected to one side of the accommodating portion for supplying external air to the heat source in order to control heat generated by the heat source.

8. The meat roaster as set forth in claim 7, wherein the heating power controller includes a blowing tube mounted at one side of the accommodating portion and communicating with an outside;

a blower mounted at an entrance side of the blowing tube for blowing external air to the heat source through the blowing tube;

a switch installed on an upper surface of the body for controlling an operation of the blower;

a knob rotatably mounted on an upper surface of the body;

a first link fixed to a lower end of the knob, the first link rotating according to a rotation of the knob;

a second link hingedly connected to the first link; and an opening/closing portion hingedly connected to the second link for controlling an amount of the external air from the blower.

9. A meat roaster, said roaster comprising:

a grill including a frame having a plurality of guiding members formed at lower corners thereof and a fluid circulating pine mounted at one side of a frame in such a manner that the pipe is repeatedly bent at regular intervals, the pipe having an inlet socket formed at one end of the pipe and an outlet socket at the other end of the pipe;

a body including an accommodating portion for accommodating the grill and a heat source and a plurality of guide rods vertically fixed on each corner of the accommodating portion;

first and second connecting members connected to one ends of first and second hoses for connecting the grill to the body, respectively; and a temperature controller for controlling the fluid circulating through the pipe of the grill at a predetermined temperature.

10. The meat roaster as set forth in claim 9, wherein each of the guiding members includes a coupling portion formed on the lower surface of the frame so that each of the guide rods is coupled to the coupling portion; and a detach preventing member formed perpendicularly to the coupling portion for preventing each of the guide rods coupled to the coupling portion from detaching.

11. The meat roaster as set forth in claim 9, wherein each of the first and second connecting members includes a first groove formed on an upper surface of one of inlet and outlet ports;

a first connector inserted into the first groove and having an annular groove formed on an upper surface of the accommodating portion;

a second connector having an annular projection formed on one surface thereof; and a second groove formed on a lower surface of one of the inlet and outlet sockets so that the other surface of the second connector is inserted into the second groove.

12. A meat roaster, said roaster comprising:

a grill including at least one heat plate disposed apart from a heat source at a predetermined distance and a fluid circulating pipe mounted on at least one surface of the at least one heat plate in such a manner that the pipe is repeatedly bent at regular intervals, the pipe having an inlet socket formed at one end of the pipe into the pipe and an outlet socket at the other end of the pipe;

a body including an accommodating portion for accommodating the grill and heat source, the accommodating portion is stepped;

an attaching member connected to one ends of first and second hoses for attaching or detaching the grill to and from the body; and a temperature controller for controlling the fluid, circulating through the pipe of the grill at a predetermined temperature.

13. The meat roaster as set forth in claim 12, wherein the at least one heat plate includes a groove formed on at least one of lower and upper surfaces thereof such a manner that the groove is repeatedly bent at regular intervals so that the fluid circulating pipe is inserted into the groove; and a hook formed at an outer side of a hole which is formed perpendicularly to the at least one heat plate.

14. The meat roaster as set forth in claim 12, wherein the at least one heat plate includes at least one receiving path formed on an upper surface thereof.

15. The meat roaster as set forth in claim 12, wherein the heat plate includes a plurality of horizontal portions which are arranged highest to lowest in an order from a center to an edge thereof and a plurality of vertical walls between the horizontal portions having a plurality of holes formed at predetermined intervals.

16. The meat roaster as set forth in claim 12, wherein the heat plate includes a plurality of horizontal plates which are arranged highest to lowest in an order from a center to both sides thereof and a plurality of holes between the horizontal plates.

\* \* \* \* \*

UNITED STATES PATENT AND TRADEMARK OFFICE
CERTIFICATE OF CORRECTION

PATENT NO.   : 6,405,639 B1
DATED        : June 18, 2002
INVENTOR(S)  : Keun-Jin Lee and Kwan-Cheol Park It is certified that error appears in the above-identified patent and that said Letters Patent is hereby corrected as shown below:

<u>Column 14,</u>
Line 10, delete "pine" and insert -- pipe --.
Line 62, delete comma "," after "fluid".

Signed and Sealed this

Twenty-seventh Day of August, 2002

*Attest:*

*Attesting Officer*

JAMES E. ROGAN
*Director of the United States Patent and Trademark Office*